United States Patent
Fakoorian et al.

(10) Patent No.: US 11,690,088 B2
(45) Date of Patent: Jun. 27, 2023

(54) DYNAMIC BANDWIDTH PART SWITCHING FOR FULL DUPLEX OPERATION IN UNPAIRED SPECTRUM

(71) Applicant: QUALCOMM Incorporated, San Diego, CA (US)

(72) Inventors: Seyed Ali Akbar Fakoorian, San Diego, CA (US); Muhammad Sayed Khairy Abdelghaffar, San Jose, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 17/235,273

(22) Filed: Apr. 20, 2021

(65) Prior Publication Data
US 2021/0329646 A1    Oct. 21, 2021

Related U.S. Application Data

(60) Provisional application No. 63/013,433, filed on Apr. 21, 2020.

(51) Int. Cl.
*H04W 4/00* (2018.01)
*H04W 72/53* (2023.01)
(Continued)

(52) U.S. Cl.
CPC .............. *H04W 72/53* (2023.01); *H04L 5/14* (2013.01); *H04L 27/26025* (2021.01);
(Continued)

(58) Field of Classification Search
None
See application file for complete search history.

(56) References Cited

U.S. PATENT DOCUMENTS

2019/0089502 A1* 3/2019 Yi ..................... H04W 72/0453
2019/0342907 A1* 11/2019 Huang ................. H04L 5/0048
(Continued)

FOREIGN PATENT DOCUMENTS

WO    WO-2019029510 A1    2/2019

OTHER PUBLICATIONS

International Search Report and Written Opinion—PCT/US2021/028223—ISA/EPO—dated Jul. 9, 2021.

*Primary Examiner* — Zewdu A Beyen
(74) *Attorney, Agent, or Firm* — Holland & Hart LLP

(57) ABSTRACT

Methods, systems, and devices for wireless communications are described. A user equipment (UE) may communicate with a base station using a bandwidth part (BWP) configuration in a component carrier (CC). The UE may transmit an indication of a capability of the UE to operate in a full duplex (e.g., frequency division duplex (FDD)) mode on a single carrier in an unpaired frequency spectrum based on a first BWP configuration. The UE may receive an indication of a second BWP configuration for one or more slots based on transmitting the indication of the capability of the UE, the second BWP configuration including a configuration associated with an uplink BWP and a downlink BWP. The UE and the base station may then communicate according to the second BWP configuration in the one or more slots of the set of slots based on receiving the indication of the second BWP configuration.

30 Claims, 21 Drawing Sheets

(51) Int. Cl.
  *H04W 72/0453* (2023.01)
  *H04L 27/26* (2006.01)
  *H04L 5/14* (2006.01)
  *H04W 8/24* (2009.01)
  *H04W 72/0446* (2023.01)
  *H04W 72/23* (2023.01)
(52) U.S. Cl.
  CPC ......... *H04W 8/24* (2013.01); *H04W 72/0446* (2013.01); *H04W 72/0453* (2013.01); *H04W 72/23* (2023.01)

(56) References Cited

U.S. PATENT DOCUMENTS

2020/0213066 A1\* 7/2020 Ma ..................... H04L 5/0092
2020/0382354 A1\* 12/2020 Sengupta ................ H04L 5/001

\* cited by examiner

Uplink Control 310

Downlink Control 320

Downlink Bandwidth Part 405

Uplink Bandwidth Part 410

400

DYNAMIC BANDWIDTH PART SWITCHING FOR FULL DUPLEX OPERATION IN UNPAIRED SPECTRUM

CROSS REFERENCE

The present application for patent claims the benefit of U.S. Provisional Patent Application No. 63/013,433 by Fakoorian et al., entitled "DYNAMIC BANDWIDTH PART SWITCHING FOR FREQUENCY DIVISION OPERATION IN UNPAIRED SPECTRUM," filed Apr. 21, 2020, assigned to the assignee hereof, and expressly incorporated by reference in its entirety herein.

FIELD OF TECHNOLOGY

The following relates generally to wireless communications and more specifically to dynamic bandwidth part switching for full duplex operation in unpaired spectrum.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support dynamic bandwidth part (BWP) switching for full duplex operation in unpaired spectrum. Generally, the described techniques relate to a user equipment (UE) communicating with a base station using a BWP configuration in a component carrier (CC). The UE may transmit an indication of a capability of the UE to operate in a full duplex (e.g., frequency division duplex (FDD)) mode, for example, on a single carrier in an unpaired frequency spectrum based on a first BWP configuration. The UE may receive, from the base station as part of dynamic BWP switching, an indication of a second BWP configuration for one or more slots based on transmitting the indication of the capability of the UE, the second BWP configuration including a configuration associated with an uplink BWP and a downlink BWP. The UE and the base station may then communicate according to the second BWP configuration in the one or more slots of the set of slots based on receiving the indication of the second BWP configuration.

A method for wireless communications at a user equipment (UE) is described. The method may include transmitting an indication of a capability of the UE to operate in a full duplex mode on a single carrier in an unpaired radio frequency spectrum based on a first BWP configuration, receiving an indication of a second BWP configuration for one or more slots of a set of multiple slots based on transmitting the indication of the capability of the UE, the second BWP configuration including a configuration associated with an uplink BWP and a downlink BWP, and communicating according to the second BWP configuration in the one or more slots of the set of multiple slots based on receiving the indication of the second BWP configuration.

An apparatus for wireless communications at a UE is described. The apparatus may include a processor, memory coupled with the processor, and instructions stored in the memory. The instructions may be executable by the processor to cause the apparatus to transmit an indication of a capability of the UE to operate in a full duplex mode on a single carrier in an unpaired radio frequency spectrum based on a first BWP configuration, receive an indication of a second BWP configuration for one or more slots of a set of multiple slots based on transmitting the indication of the capability of the UE, the second BWP configuration including a configuration associated with an uplink BWP and a downlink BWP, and communicate according to the second BWP configuration in the one or more slots of the set of multiple slots based on receiving the indication of the second BWP configuration.

Another apparatus for wireless communications at a UE is described. The apparatus may include means for transmitting an indication of a capability of the UE to operate in a full duplex mode on a single carrier in an unpaired radio frequency spectrum based on a first BWP configuration, means for receiving an indication of a second BWP configuration for one or more slots of a set of multiple slots based on transmitting the indication of the capability of the UE, the second BWP configuration including a configuration associated with an uplink BWP and a downlink BWP, and means for communicating according to the second BWP configuration in the one or more slots of the set of multiple slots based on receiving the indication of the second BWP configuration.

A non-transitory computer-readable medium storing code for wireless communications at a UE is described. The code may include instructions executable by a processor to transmit an indication of a capability of the UE to operate in a full duplex mode on a single carrier in an unpaired radio frequency spectrum based on a first BWP configuration, receive an indication of a second BWP configuration for one or more slots of a set of multiple slots based on transmitting the indication of the capability of the UE, the second BWP configuration including a configuration associated with an uplink BWP and a downlink BWP, and communicate according to the second BWP configuration in the one or more slots of the set of multiple slots based on receiving the indication of the second BWP configuration.

In some examples of the method, apparatuses, and non-transitory computer-readable medium described herein, receiving the indication of the second BWP configuration may include operations, features, means, or instructions for receiving an indication that the uplink BWP and the downlink BWP may have different BWP identifiers, different sub-carrier spacings, or both.

In some examples of the method, apparatuses, and non-transitory computer-readable medium described herein, receiving the indication of the second BWP configuration may include operations, features, means, or instructions for receiving an indication that the uplink BWP and the downlink BWP may have one or more same BWP identifiers, and one or more of different sub-carrier spacings or different center frequencies.

In some examples of the method, apparatuses, and non-transitory computer-readable medium described herein, receiving the indication of the second BWP configuration may include operations, features, means, or instructions for receiving an indication that the uplink BWP and the downlink BWP may have one or more same BWP identifiers, and one or more of one or more same sub-carrier spacings or one or more same center frequencies.

In some examples of the method, apparatuses, and non-transitory computer-readable medium described herein, transmitting the indication of the capability of the UE to operate in the full duplex mode may include operations, features, means, or instructions for transmitting an indication of a capability of the UE to operate in a sub-band full-duplex mode.

In some examples of the method, apparatuses, and non-transitory computer-readable medium described herein, receiving the indication of the second BWP configuration may include operations, features, means, or instructions for receiving an indication of a guard band between the uplink BWP and the downlink BWP, the indication of the guard band indicating that the guard band may be greater than a threshold.

In some examples of the method, apparatuses, and non-transitory computer-readable medium described herein, receiving the indication of the second BWP configuration may include operations, features, means, or instructions for receiving DCI indicating a change of an active BWP corresponding to one of the uplink BWP or the downlink BWP based on a guard band between the uplink BWP and the downlink BWP being less than a threshold and adjusting, based on the DCI, one of the uplink BWP or the downlink BWP such that the guard band between the uplink BWP and the downlink BWP may be greater than the threshold.

In some examples of the method, apparatuses, and non-transitory computer-readable medium described herein, receiving the DCI indicating the change of the active BWP may include operations, features, means, or instructions for receiving a downlink DCI indicating a change in a downlink BWP and adjusting, based at least in part in the downlink DCI, the downlink BWP and an uplink BWP.

In some examples of the method, apparatuses, and non-transitory computer-readable medium described herein, receiving the DCI indicating the change of the active BWP may include operations, features, means, or instructions for receiving an uplink DCI indicating a change in an uplink BWP and adjusting, based at least in part in the uplink DCI, the uplink BWP and a downlink BWP.

In some examples of the method, apparatuses, and non-transitory computer-readable medium described herein, the uplink BWP and the downlink BWP each correspond to different BWP identifiers based on adjusting the one of the uplink BWP or the downlink BWP.

In some examples of the method, apparatuses, and non-transitory computer-readable medium described herein, receiving the indication of the second BWP configuration may include operations, features, means, or instructions for receiving DCI indicating a change of an active BWP corresponding to one of the uplink BWP or the downlink BWP based on a guard band between the uplink BWP and the downlink BWP being less than a threshold and adjusting, based on DCI, the uplink BWP and the downlink BWP such that the guard band between the uplink BWP and the downlink BWP may be greater than the threshold.

In some examples of the method, apparatuses, and non-transitory computer-readable medium described herein, the uplink BWP and the downlink BWP may have a same BWP identifier based on adjusting the uplink BWP and the downlink BWP.

In some examples of the method, apparatuses, and non-transitory computer-readable medium described herein, receiving the indication of the second BWP configuration may include operations, features, means, or instructions for receiving DCI indicating a change of active BWPs corresponding to both of the uplink BWP and the downlink BWP and indicating a slot offset value for a downlink reception or an uplink transmission, the slot offset value being smaller than a delay for the UE to adjust the uplink BWP and the downlink BWP and adjusting, based on DCI, the uplink BWP and the downlink BWP before an expiration of the slot offset value.

In some examples of the method, apparatuses, and non-transitory computer-readable medium described herein, receiving the DCI may include operations, features, means, or instructions for receiving a scheduling DCI corresponding to a downlink DCI or an uplink DCI.

In some examples of the method, apparatuses, and non-transitory computer-readable medium described herein, receiving the indication of the second BWP configuration may include operations, features, means, or instructions for receiving DCI indicating a change of active BWPs corresponding to both of the uplink BWP and the downlink BWP and indicating a slot offset value for a downlink reception or an uplink transmission.

Some examples of the method, apparatuses, and non-transitory computer-readable medium described herein may further include operations, features, means, or instructions for refraining from communicating during a duration after receiving the DCI until a slot indicated by the slot offset value.

Some examples of the method, apparatuses, and non-transitory computer-readable medium described herein may further include operations, features, means, or instructions for determining that a priority of the DCI may be lower than a priority of a communication scheduled during a duration after receiving the DCI until a slot indicated by the slot offset value and performing the communication scheduled based on determining that the priority of the DCI may be lower than the priority of the communication.

In some examples of the method, apparatuses, and non-transitory computer-readable medium described herein, receiving the indication of the second BWP configuration may include operations, features, means, or instructions for receiving DCI indicating a change of active BWPs corresponding to both of the uplink BWP and the downlink BWP and indicating a slot offset value for a downlink reception or an uplink transmission and refraining from communicating a communication scheduled during a duration after receiving the DCI until a slot indicated by the slot offset value, the slot indicated by the offset value corresponding to a slot in which the change of the active BWPs may be to occur.

In some examples of the method, apparatuses, and non-transitory computer-readable medium described herein, receiving the indication of the second BWP configuration may include operations, features, means, or instructions for receiving DCI indicating a change of active BWPs corresponding to both of the uplink BWP and the downlink BWP and indicating a slot offset value for a downlink reception or an uplink transmission and refraining from communicating a communication scheduled during a duration after receiving a second DCI received after the DCI and until a slot indicated by the slot offset value, the slot indicated by the offset value corresponding to a slot in which the change of the active BWPs may be to occur.

In some examples of the method, apparatuses, and non-transitory computer-readable medium described herein, receiving the indication of the second BWP configuration may include operations, features, means, or instructions for receiving DCI indicating a change of active BWPs corresponding to both of the uplink BWP and the downlink BWP and indicating a different BWP identifier for each of the uplink BWP and the downlink BWP.

In some examples of the method, apparatuses, and non-transitory computer-readable medium described herein, the full duplex mode may include operations, features, means, or instructions for a FDD mode.

A method for wireless communications at a base station is described. The method may include receiving an indication of a capability of a UE to operate in a full duplex mode on a single carrier in an unpaired radio frequency spectrum based on a first BWP configuration, transmitting an indication of a second BWP configuration for one or more slots of a set of multiple slots based on receiving the indication of the capability of the UE, the second BWP configuration including a configuration associated with an uplink BWP and a downlink BWP, and communicating with the UE according to the second BWP configuration in the one or more slots of the set of multiple slots based on transmitting the indication of the second BWP configuration.

An apparatus for wireless communications at a base station is described. The apparatus may include a processor, memory coupled with the processor, and instructions stored in the memory. The instructions may be executable by the processor to cause the apparatus to receive an indication of a capability of a UE to operate in a full duplex mode on a single carrier in an unpaired radio frequency spectrum based on a first BWP configuration, transmit an indication of a second BWP configuration for one or more slots of a set of multiple slots based on receiving the indication of the capability of the UE, the second BWP configuration including a configuration associated with an uplink BWP and a downlink BWP, and communicate with the UE according to the second BWP configuration in the one or more slots of the set of multiple slots based on transmitting the indication of the second BWP configuration.

Another apparatus for wireless communications at a base station is described. The apparatus may include means for receiving an indication of a capability of a UE to operate in a full duplex mode on a single carrier in an unpaired radio frequency spectrum based on a first BWP configuration, means for transmitting an indication of a second BWP configuration for one or more slots of a set of multiple slots based on receiving the indication of the capability of the UE, the second BWP configuration including a configuration associated with an uplink BWP and a downlink BWP, and means for communicating with the UE according to the second BWP configuration in the one or more slots of the set of multiple slots based on transmitting the indication of the second BWP configuration.

A non-transitory computer-readable medium storing code for wireless communications at a base station is described. The code may include instructions executable by a processor to receive an indication of a capability of a UE to operate in a full duplex mode on a single carrier in an unpaired radio frequency spectrum based on a first BWP configuration, transmit an indication of a second BWP configuration for one or more slots of a set of multiple slots based on receiving the indication of the capability of the UE, the second BWP configuration including a configuration associated with an uplink BWP and a downlink BWP, and communicate with the UE according to the second BWP configuration in the one or more slots of the set of multiple slots based on transmitting the indication of the second BWP configuration.

In some examples of the method, apparatuses, and non-transitory computer-readable medium described herein, transmitting the indication of the second BWP configuration may include operations, features, means, or instructions for transmitting an indication that the uplink BWP and the downlink BWP may have different BWP identifiers, different sub-carrier spacings, or both.

In some examples of the method, apparatuses, and non-transitory computer-readable medium described herein, transmitting the indication of the second BWP configuration may include operations, features, means, or instructions for transmitting an indication that the uplink BWP and the downlink BWP may have one or more same BWP identifiers, and one or more of different sub-carrier spacings or different center frequencies.

In some examples of the method, apparatuses, and non-transitory computer-readable medium described herein, transmitting the indication of the second BWP configuration may include operations, features, means, or instructions for transmitting an indication that the uplink BWP and the downlink BWP may have one or more same BWP identifiers, and one or more of one or more same sub-carrier spacings or one or more same center frequencies.

In some examples of the method, apparatuses, and non-transitory computer-readable medium described herein, receiving the indication of the capability of the UE to operate in the full duplex mode may include operations, features, means, or instructions for receiving an indication of a capability of the UE to operate in a sub-band full-duplex mode.

In some examples of the method, apparatuses, and non-transitory computer-readable medium described herein, transmitting the indication of the second BWP configuration may include operations, features, means, or instructions for transmitting DCI indicating a change of active BWPs corresponding to both of the uplink BWP and the downlink BWP and indicating a slot offset value for a downlink reception or an uplink transmission.

Some examples of the method, apparatuses, and non-transitory computer-readable medium described herein may further include operations, features, means, or instructions for determining that a priority of the DCI may be lower than a priority of a communication scheduled during a duration after receiving the DCI until a slot indicated by the slot offset value and performing the communication scheduled based on determining that the priority of the DCI may be lower than the priority of the communication.

DETAILED DESCRIPTION

A user equipment (UE) and a base station may communicate according to a time division duplex (TDD) mode, a frequency division duplex (FDD) mode, or both. The UE may be capable of operating according to a half-duplex mode or a full-duplex mode in some examples. A half-duplex mode may support one-way communication via transmission or reception, but not transmission and reception concurrently or simultaneously. A full-duplex mode may include communications via transmission and reception (e.g., uplink and downlink) concurrently or simultaneously.

The UE and the base station may communicate according to a bandwidth part (BWP) configuration, which may indicate portions of radio frequency spectrum bands for uplink communications and downlink communications. The BWP configurations may apply for one or more radio frequency spectrum bands of a component carrier (CC). According to a communication configuration, some slots of a CC may be configured for TDD communications, and some slots may be configured for FDD communications. Each TDD or FDD configuration may be indicated by a BWP configuration. In the slots configured for FDD configurations, some sub-bands of the CC may be allocated for uplink communications by a UE, and some sub-bands of the CC may be allocated for downlink communications by the UE.

The UE may transmit an indication of a capability of the UE to operate in a full duplex (E.G., FDD) mode on a single carrier in an unpaired radio frequency spectrum based on a first BWP configuration. The capability indication may, for examples, include an indication of whether the UE is capable of communicating in a full-duplex mode or a half-duplex mode. Based on receiving the capability indication from the UE, a base station may transmit an indication of a second BWP for one or more slots of a set of slots. The second BWP configuration may be associated with an uplink BWP, or a downlink BWP configuration, or both. Based on the second BWP configuration, the UE may make adjustments to one or more active uplink BWPs or one or more downlink BWPs (or both) of the CC. The UE and the base station may then communication according to the second BWP in the one or more slots of the set of slots.

Aspects of the disclosure are initially described in the context of wireless communications systems. Aspects of the disclosure are then described in the context of spectrum configurations and process flows. Aspects of the disclosure are further illustrated by and described with reference to apparatus diagrams, system diagrams, and flowcharts that relate to dynamic BWP switching for full duplex operation in unpaired spectrum.

Figure 1:
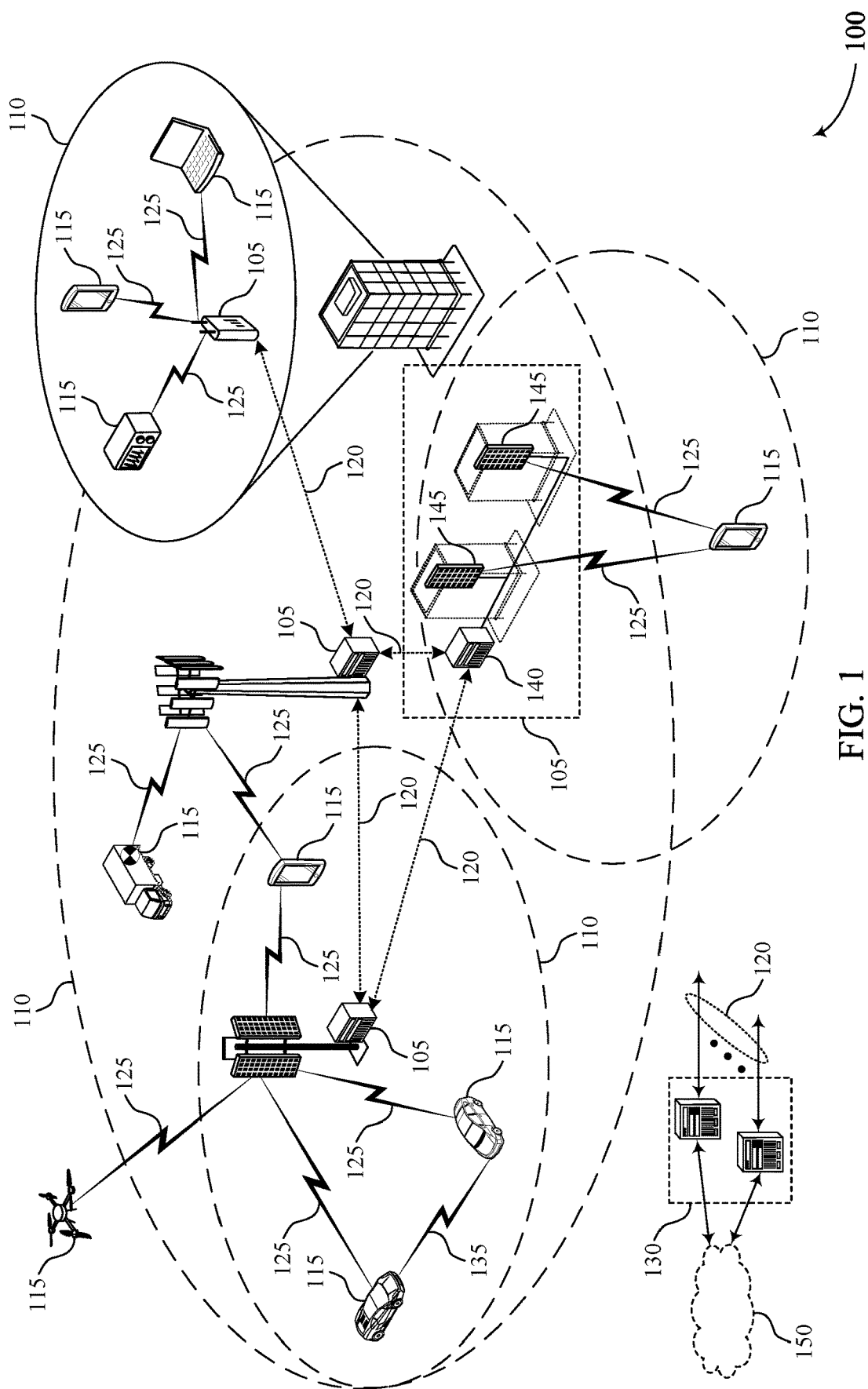
FIG. 1 illustrates an example of a wireless communications system that supports dynamic bandwidth part (BWP) switching for full duplex operation in unpaired spectrum in accordance with aspects of the present disclosure.

FIG. 1 illustrates an example of a wireless communications system 100 that supports dynamic BWP switching for full duplex operation in unpaired spectrum in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support concurrent or simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently or simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guardband of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may communicate with a base station 105 using a BWP configuration in a CC. The UE 115 may transmit an indication of a capability of the UE 115 to operate in a FDD mode on a single carrier in an unpaired frequency spectrum based on a first BWP configuration. The UE 115 may receive, from the base station 105, an indication of a second BWP configuration for one or more slots based on transmitting the indication of the capability of the UE 115, the second BWP configuration including a configuration associated with an uplink BWP and a downlink BWP. The UE 115 and the base station 105 may then communicate according to the second BWP configuration in the one or more slots of the set of slots based on receiving the indication of the second BWP configuration.

Figure 2:
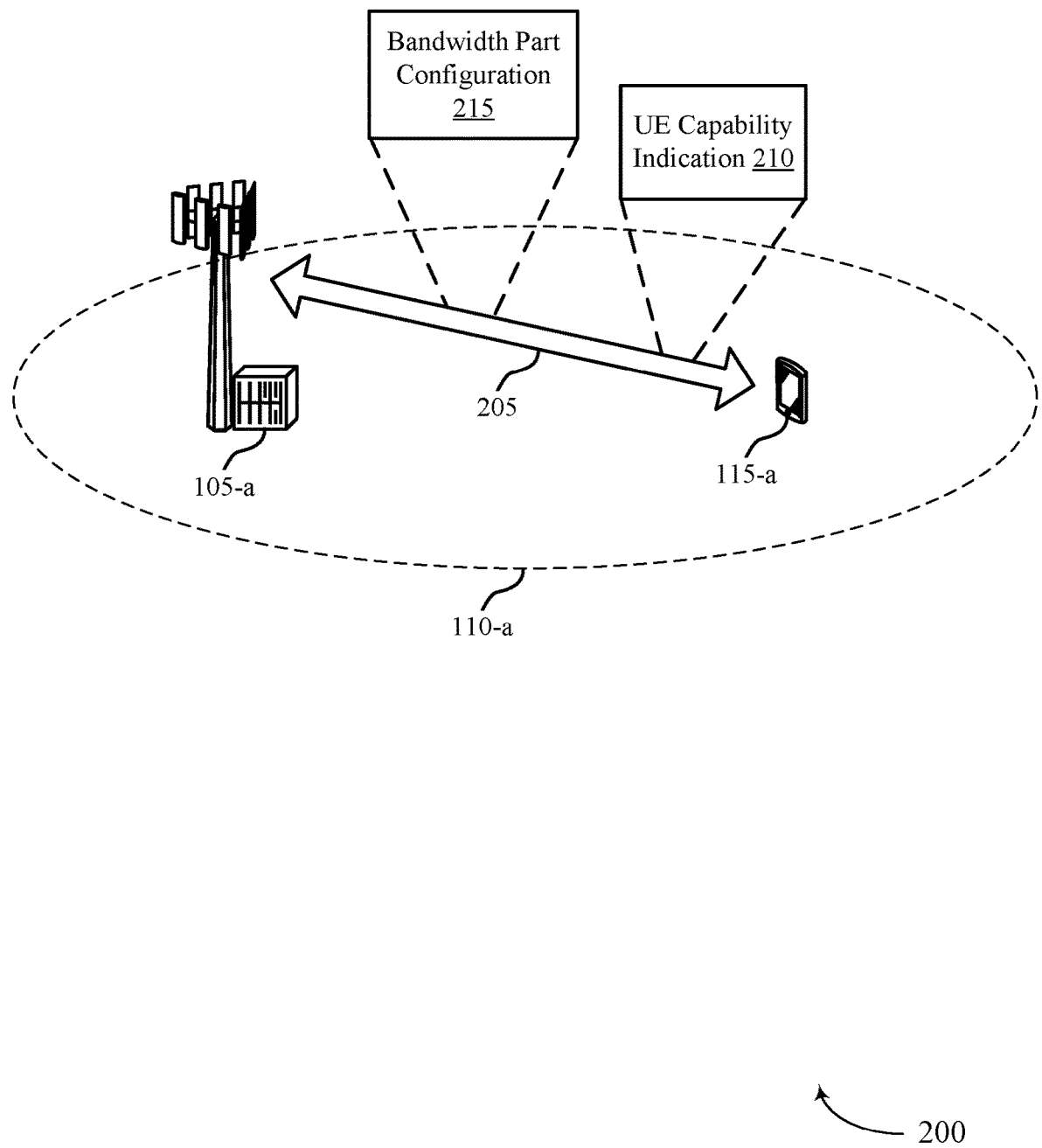
FIG. 2 illustrates an example of a wireless communications system that supports dynamic BWP switching for full duplex operation in unpaired spectrum in accordance with aspects of the present disclosure.

FIG. 2 illustrates an example of a wireless communications system 200 that supports dynamic BWP switching for full duplex operation in unpaired spectrum in accordance with aspects of the present disclosure. In some examples, wireless communications system 200 may implement aspects of wireless communications system 100. UE 115-*a* may be an example of a UE 115 as described with respect to FIG. 1, and base station 105-*a* may be an example of a base station 105 as described with respect to FIG. 1. Base station 105-*a* may serve one or more UEs 115, including UE 115-*a*, in coverage area 110-*a*. Base station 105-*a* and UE 115-*a* may communicate over communication channel 205.

UE 115-*a* and base station 105-*a* may communicate according to a communication configuration in a CC. A CC may be a frequency band that may include different BWPs, which may split up communication configurations by frequency band and by slot. The communication configurations may include full duplex configurations, including TDD configurations and FDD configurations. For example, a first slot may be configured for TDD communications, including downlink communications for a time duration, followed by uplink communication for a time duration. Another slot may be configured for full duplex (e.g., FDD) communications, in which downlink communications and uplink communications occur in separate frequency bands, in the same slot.

UE 115-*a* may be capable of communicating in a half-duplex configuration or a full-duplex configuration. The half-duplex configuration may include a capability to communicate in one direction (e.g., uplink or downlink) at a time. In the case of a full-duplex capability, UE 115-*a* may be capable of performing downlink and uplink communications in overlapping time resources. In some cases, UE 115-*a* may have the capability to perform sub-band full-duplex communications, which may include a capability to perform full-duplex communications in different sub-bands of a CC.

UE 115-*a* may transmit UE capability indication 210, indicating a capability of UE 115-*a* to operate in a full duplex (e.g., FDD) mode on a single carrier in an unpaired radio frequency spectrum, based on a first BWP configuration. The first BWP configuration may have been previously configured by base station 105-*a*, and indicated to UE 115-*a* in control signaling. This BWP configuration may correspond to BWP with identifier of value zero. UE 115-*a* may include in UE capability indication 210 an indication of whether UE 115-*a* is capable of operating in a sub-band full-duplex mode or a half duplex mode. UE 115-*a* may further be capable of dynamically switching BWP configurations, based on a BWP configuration 215 received from base station 105-*a*.

Based on UE capability indication 210, base station 105-*a* may transmit BWP configuration 215. In many cases, the BWP configuration 215 may be based on whether UE 115-*a* is capable of communicating according to a half-duplex mode or a sub-band full-duplex mode. BWP configuration 215 may be a second BWP configuration (in some cases different from the first BWP configuration). BWP configuration 215 may indicate a BWP configuration for one or more slot of a set of slots, and may include a configuration associated with an uplink BWP and a downlink BWP.

UE 115-*a* may receive BWP configuration 215, and may dynamically determine a BWP configuration based on which to communicate with base station 105-*a*. In some cases, BWP configuration 215 may include one or more BWP identifiers, indicating various uplink or downlink BWPs for UE 115-*a* to use. The network may configure the multiple BWPs with consecutive identifiers, starting with identifier 1 (as identifier zero may have been used for an initial BWP).

In some cases, BWP configuration 215 may include an indication of either an uplink BWP or a downlink BWP, as well as a guard band indication, or an indication of a threshold guard band. UE 115-*a* may dynamically determine adjustments to BWP configuration 215, in some cases on a slot by slot basis. UE 115-*a* may determine to adjust a previous uplink BWP and a downlink BWP, based on whether the indicated guard band satisfies a threshold guard band. The guard band may be indicated explicitly or implicitly. In an implicit example, UE 115-*a* may receive an indication of a change to an uplink BWP, which may include a frequency band closer to a configured downlink BWP. UE 115-*a* may determine that a threshold guard band is not longer satisfied between the previously configured downlink BWP and the uplink BWP. UE 115-*a* may therefore determine to also adjust the downlink BWP. UE 115-*a* may adjust the downlink BWP based one pairing the downlink BWP with the same identifier as the uplink BWP, in some cases. Thus, UE 115-*a* may adjust both the uplink BWP and the downlink BWP based on receiving a change in the active BWP for either the uplink BWP or the downlink BWP. This adjustment of either the uplink BWP or the downlink bandwidth part may be an example of UE 115-*a* dynamically configuring a BWP configuration, based on an indicated BWP configuration 215 from base station 105-*a*.

In some cases, BWP configuration 215 may be indicated in a downlink control information (DCI) transmission from base station 105-*a*. In some cases, BWP configuration 215 may indicate a slot offset value. UE 115-*a* may adjust the uplink BWP and the downlink BWP based on the slot offset value. In some cases, based on parameters indicated in BWP configuration 215, UE 115-*a* may determine whether to communicate in intermediate slots, for example, between when BWP configuration 215 is received and a slot in which the BWP configuration 215 is applied. In some examples, UE 115-*a* may drop communication within these intermediate slots, or may communicate higher priority communications in the intermediate slots.

In some cases, the uplink BWP and the downlink BWP may be indicated as a pair of BWPs. In some of these cases, the uplink BWP and the downlink BWP correspond to the same identifier number, and may have the same or different sub-carrier scapings (SCSs). The pairs of BWPs may also have different center frequencies. In other cases, the BWP configuration may indicate independent downlink BWPs and uplink BWPs (e.g., with different identifiers). In this case, UE 115-*a* may receive separate identifiers for each of the uplink BWP and the downlink BWP. The DCI may have a BWP switching field, which may include the number of bits equal to two to the number of possible uplink or downlink BWP identifiers. This bit mapping may provide scheduling flexibility, but include more signaling bits than just signaling either an uplink BWP or a downlink BWP.

Based on receiving BWP configuration 215 and adjusting the associated uplink BWPs, downlink BWPs, or both, UE 115-*a* and base station 105-*a* may communicate according to the adjusting uplink BWPs and downlink BWPs.

Figure 3A:
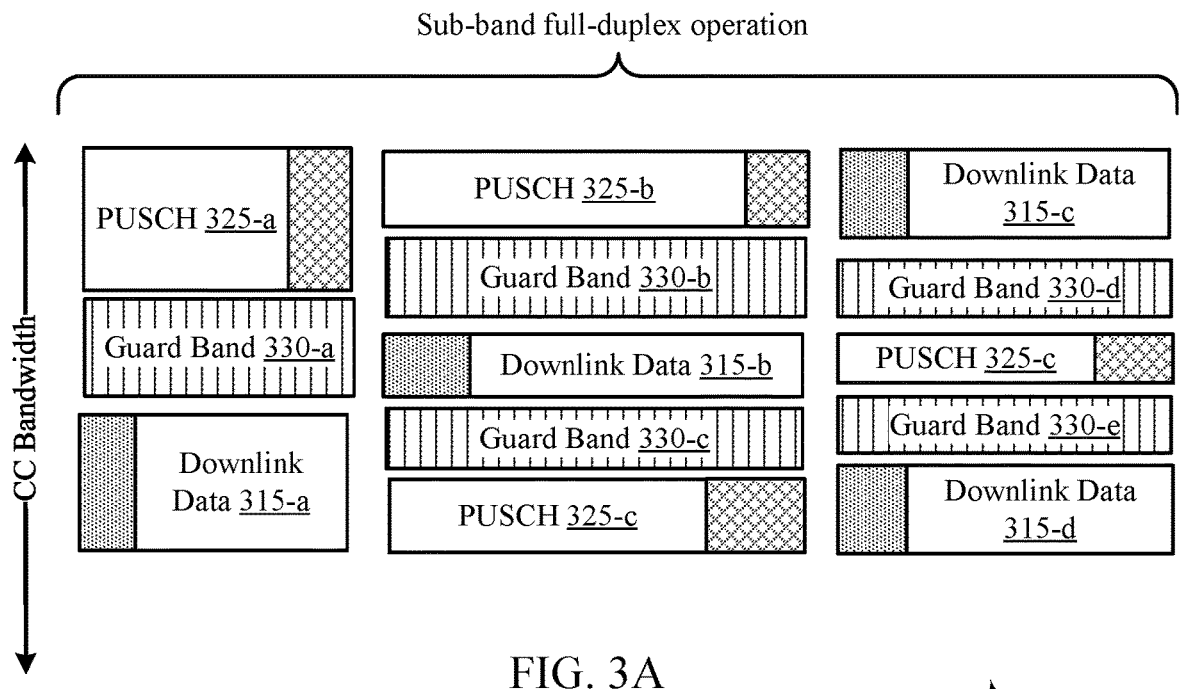
FIG. 3A-3C illustrate examples of spectrum configurations that support dynamic BWP switching for full duplex operation in unpaired spectrum in accordance with aspects of the present disclosure.
Figure 3B:
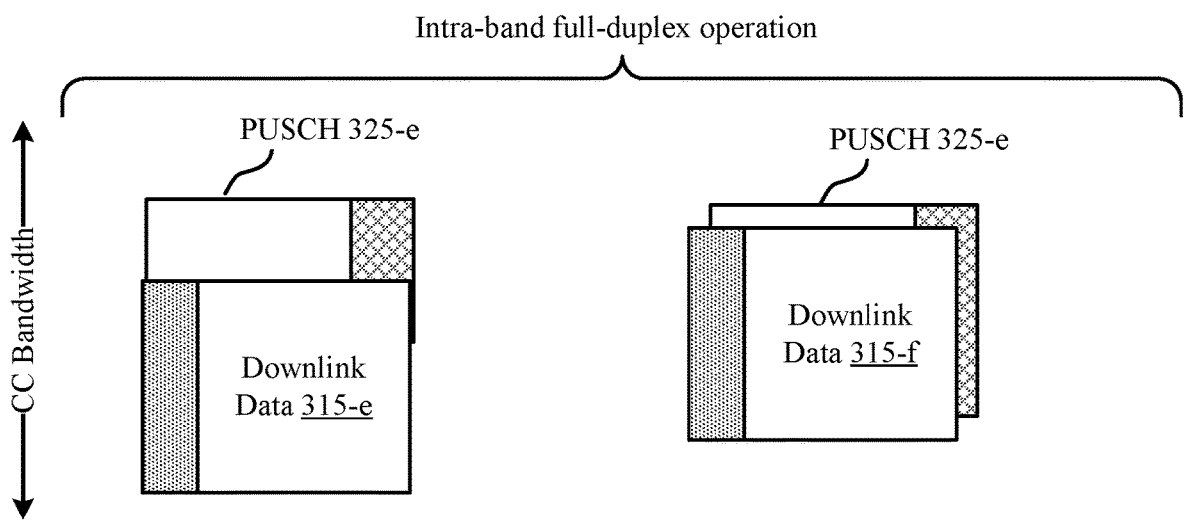
Figure 3B:
Figure 3B:
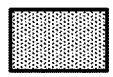

FIGS. 3A and 3B illustrate examples of spectrum configurations 301 and 302 that support dynamic BWP switching for full duplex operation in unpaired spectrum in accordance with aspects of the present disclosure. In some examples, spectrum configurations 301 and 302 may be implemented by aspects of wireless communications systems 100 and 200. A UE 115 and a base station 105 may communicate according to spectrum configurations 301 and 302. Spectrum configurations 301 and 302 may be examples of communication configurations according to which a UE 115 and a base station 105 may communicate. In some examples, each downlink control 320 may schedule downlink communications, such as downlink data 315.

FIG. 3A illustrates examples of sub-band full duplex mode in which the component carrier frequency bandwidth is split into non-overlapping uplink and downlink BWPs and one or more optional guard bands in between. In some examples, the uplink BWP and downlink BWP may be separated by a guard band. For example, PUSCH 325-*a* and downlink data 315-*a* may be separated by guard band 330-*a*. In some other examples, the uplink BWP may be non-contiguous in frequency allocation around the downlink BWP and multiple guard bands. For example, PUSCH 325-*b* and downlink data 315-*b* may be separated by guard band 330-*b*, and downlink data 315-*b* may be separated from PUSCH 325-*c* by guard band 330-*c*. In some examples, the downlink BWP may have non-contiguous frequency allocation around the uplink BWP and may be separated by multiple guard bands. For example, downlink data 315-*c* may be separated from PUSCH 325-*c* by guard band 330-*d*, and PUSCH 325-*c* may be separated from downlink data 315-*d* by guard band 330-*e*.

FIG. 3B illustrates examples of in-band full duplex mode in which the component carrier frequency bandwidth may be split in overlapping uplink and downlink BWPs. In some scenarios, the uplink BWPs and downlink BWPs may be partially overlapping in some frequency resources. For example, downlink data 315-*e* and PUSCH 315-*e* may partially overlap. In some other examples, the uplink and downlink BWPs may be fully overlapping. For example, PUSCH 325-*e* and downlink data 315-*f* may fully overlap.

Figure 3C:
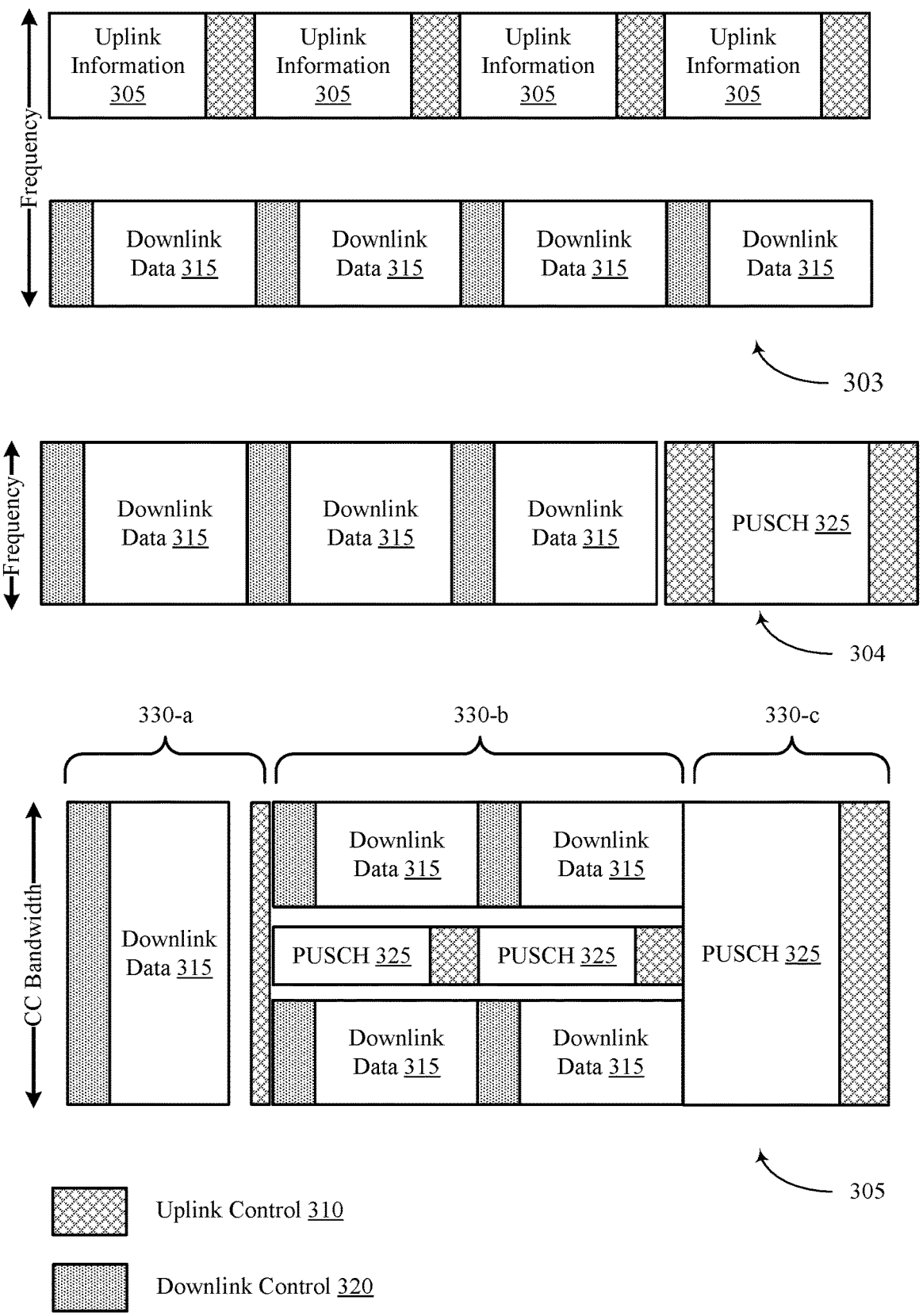

FIG. 3C illustrates examples of spectrum configurations 303, 304, and 305 that support dynamic BWP switching for full duplex operation in unpaired spectrum in accordance with aspects of the present disclosure. In some examples, spectrum configurations 303, 304, and 305 may be implemented by aspects of wireless communications systems 100 and 200. A UE 115 and a base station 105 may communicate according to spectrum configurations 303, 304, and 305.

Spectrum configurations 303, 304, and 305, may be examples of communication configurations according to which a UE 115 and a base station 105 may communicate. Each uplink control 310 may schedule uplink information 305 communications. Each downlink control 320 may schedule downlink communications, such as downlink data 315.

Spectrum configuration 303 may be an example of a paired spectrum configuration. Spectrum configuration 303 may include an uplink BWP including uplink communications (uplink information 305 and uplink control 310), and a downlink BWP including downlink control 320 and downlink data 315. Spectrum configuration 201 may therefore illustrate a FDD configuration, where uplink communications and downlink communication are allocated separate frequency resources, but overlapping time resources.

Spectrum configuration 304 may be an example of unpaired spectrum. In this case, a frequency band may be allocated for downlink control 320, downlink data 315, uplink control 310, and PUSCH 325. These separate uplink and downlink portions may be allocated for the same frequency, but the uplink and downlink resources may not overlap in time.

Spectrum configuration 305 may be an example of a sub-band unpaired spectrum configuration. In this case, whether a slot is TDD configured or FDD configured varies based on the BWP. First section 330-a may be an example of a TDD downlink slot. Second section 330-b may be an example of three different BWPs. A first downlink BWP (including downlink control 320 and downlink data 315), a first uplink BWP (including PUSCH 325 and uplink control 310), and a second downlink BWP (including downlink control 320, and downlink data 315) may each be allocated different frequencies of the CC bandwidth, but each downlink and uplink BWP may overlap (e.g., at least partially) in time. Third section 330-c may be an example of a TDD uplink slot.

The configuration shown in spectrum configuration 305 may be an example of a possible sub-band FDD unpaired spectrum configuration in accordance with aspects of the present disclosure. A UE 115 may indicate to a base station 105 a capability of the UE 115 to operate in a full duplex (e.g., FDD) mode on a single carrier in an unpaired radio frequency spectrum, for example as shown in spectrum configuration 305. The UE 115 may also indicate a half-duplex or sub-band full-duplex capability. In the case of a half duplex capability, the UE 115 may be capable of communicating according to the BWPs shown in 330-a and 330-c, and in the case of sub-band full-duplex capability, the UE 115 may be capable of operating according to the BWPs shown in each 330-a, 330-b, and 330-c.

Figure 4:
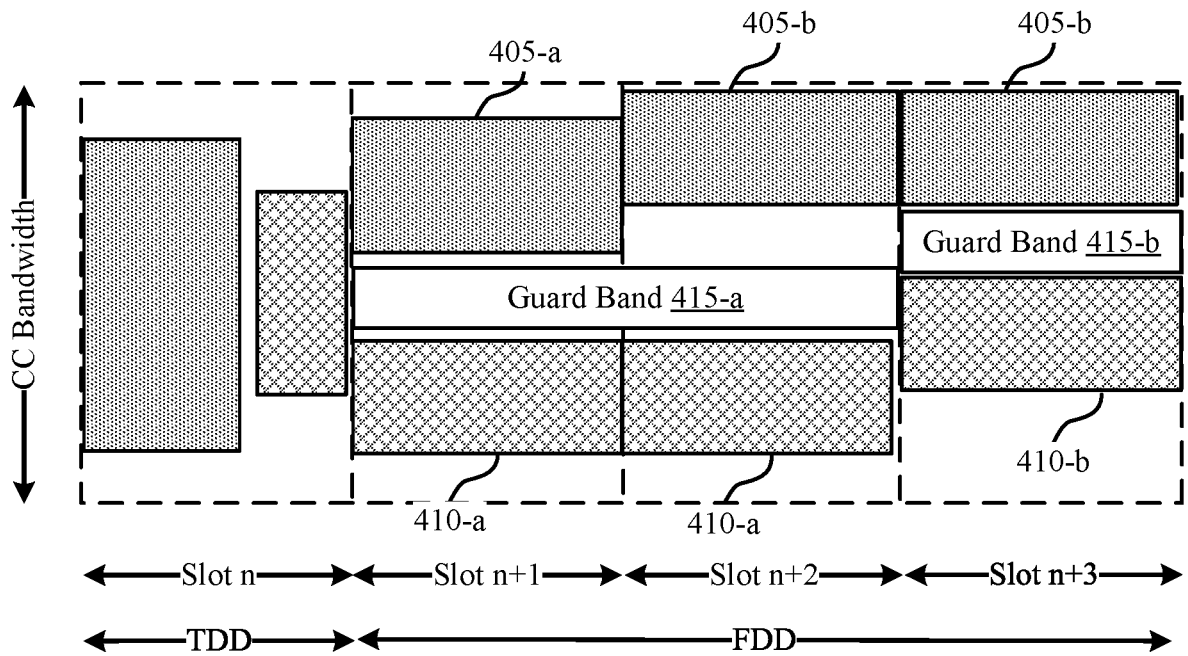
FIG. 4 illustrates an example of a spectrum configuration that supports dynamic BWP switching for full duplex operation in unpaired spectrum in accordance with aspects of the present disclosure.
Figure 4:
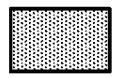
Figure 4:
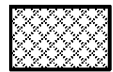

FIG. 4 illustrates an example of a spectrum configuration 400 that supports dynamic BWP switching for full duplex operation in unpaired spectrum in accordance with aspects of the present disclosure. In some examples, spectrum configuration 400 may be implemented by aspects of wireless communications systems 100 and 200. A UE 115 and a base station 105 may communicate according to the spectrum configuration 400. A base station 105 may transmit an indication of spectrum configuration 400 in a BWP configuration indication. The BWP configuration shown in spectrum configuration 400 may include downlink BWPs 405 and uplink BWPs 410.

A UE 115 may indicate, to a base station 105, a capability of operating according to a full duplex (e.g., FDD) mode on a single carrier in an unpaired radio frequency spectrum. Based on this indication, the base station 105 may transmit a BWP configuration, including an indication of downlink BWPs 405, uplink BWPs 410, or both. In many cases, the BWP configuration may include an indication of a downlink BWP 405 corresponding to an identifier number, an uplink BWP 410 corresponding to an identifier, or both.

In one case, the downlink BWPs 405 and the uplink BWPs 410 may have different BWP identifiers, or different SCSs, or both, as indicated in the BWP configuration. BWP configuration may include an indication of pairs of downlink BWPs 405 and uplink BWPs 410, where each pair has the same identifier. However, the pairs of downlink BWPs 405 and uplink BWPs with the same identifiers may have the same or different SCSs and center frequencies. In other cases, the pair of downlink BWP 405 and uplink BWP 410 may have different identifiers, or different SCSs, or both.

For example, spectrum configuration 400 may be indicated to a UE 115. In cases where the UE 115 is capable of supporting half-duplex communications, the UE 115 may communicate according to the configuration in slot n. In cases where the UE 115 is capable of communicating in a sub-band full-duplex mode, the UE 115 may communicate according to the configuration shown in each slot of spectrum configuration 400.

The BWP configuration may include a slot by slot BWP configuration. The BWPs in slot n may be an example of a TDD slot, and a case where the downlink BWP 405 and the uplink BWP 410 are indicated as a pair in the BWP configuration. Both the downlink BWP 405 and the uplink BWP 410 may, in some examples, correspond to a same identifier. In some examples, the downlink BWP 405 and the uplink BWP 410 shown in slot n may have the same center frequency, and may both correspond to the same identifier number. In some examples, the downlink BWP 405 and the uplink BWP 410 may have different SCSs. A UE 115 may operate in a half-duplex configuration according to the configuration in slot n.

In slot n+1, the downlink BWP 405-a and uplink BWP 410-a may also be indicated as a pair in the BWP configuration. Downlink BWP 405-a and uplink BWP 410-a in slot n+1 may correspond to the same identifier. Downlink BWP 405-a and uplink BWP410-a may, in some examples, have different SCSs and different center frequencies. The BWP configuration may also indicate guard band 415-a, and UE 115 may determine whether the guard band 415 satisfies a minimum guard band threshold (which threshold may be preconfigured at the UE or may be received from a devices, such as a base station). A UE 115 may operate in a sub-band full-duplex mode according to the configuration in slot n+1.

In slot n+2, the downlink BWP 405-a and uplink BWP 410-a may be indicated in the BWP configuration, and may have different identifiers in some examples. Downlink BWP 405-a and uplink BWP 410-a may have different center frequencies but the same SCS. The BWP configuration for slot n+2 may, in some examples, indicate guard band 415-a, which may satisfy a minimum guard band threshold. A UE 115 may operate in a sub-band full-duplex mode according to the configuration in slot n+2.

In slot n+3, downlink BWP 405-b and uplink BWP 410-a may have the same identifier, and the same SCS, but different center frequencies in some examples. The BWP configuration may also indicate guard band 415-a, which may satisfy a minimum guard band threshold. A UE 115 may operate in a sub-band full-duplex mode according to the configuration in slot n+2.

Based on receiving the BWP configuration shown in spectrum configuration 300, a UE 115 may communicate in one or more slots, if not each slot, according to the capabilities of the UE 115, and based on the communication direction and configuration indicated in each slot.

Figure 5:
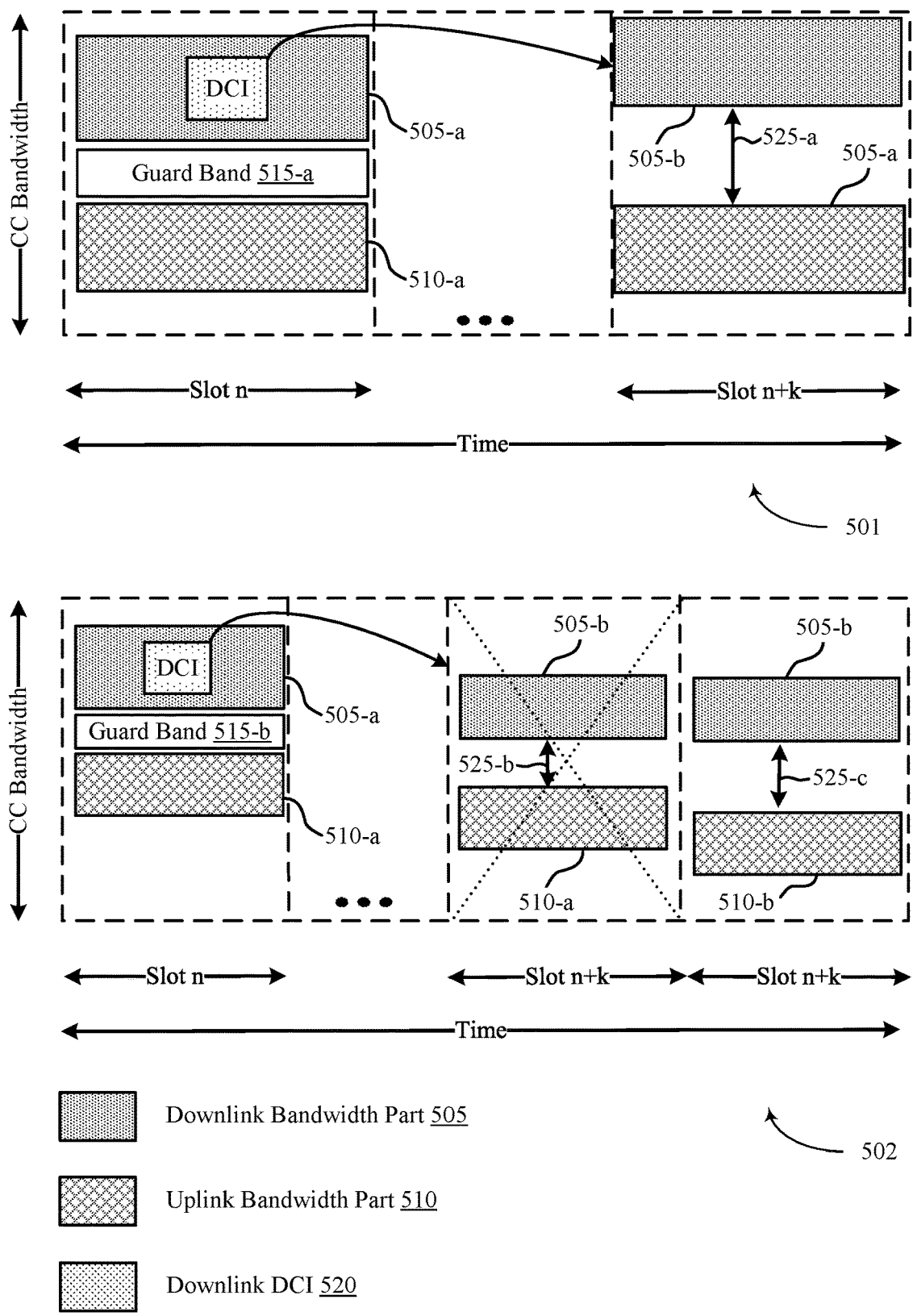
FIG. 5 illustrates an example of a spectrum configuration that supports dynamic BWP switching for full duplex operation in unpaired spectrum in accordance with aspects of the present disclosure.

FIG. 5 illustrates examples of spectrum configurations 501 and 502 that supports dynamic BWP switching for full duplex operation in unpaired spectrum in accordance with aspects of the present disclosure. In some examples, spectrum configurations 501 and 502 may be implemented by aspects of wireless communications systems 100 and 200. A UE 115 and a base station 105 may communicate according to the spectrum configurations 501 and 502. A base station 105 may transmit an indication of spectrum configurations 501 and 502 in a BWP configuration indication. The BWP configuration shown in spectrum configurations 501 and 502 may include downlink BWPs 505 and uplink BWPs 510.

A UE 115 may indicate, to a base station 105, a capability of operating according to a FDD mode, for example a full-duplex mode or a half-duplex mode, on a single carrier in an unpaired radio frequency spectrum. Based on this indication, the base station 105 may transmit a BWP configuration, including an indication of downlink BWPs 505, uplink BWPs 510, or both. In many cases, the BWP configuration may include an indication of a downlink BWP 505 corresponding to an identifier number, an uplink BWP 510 corresponding to an identifier, or both.

The UE 115 may further be capable of dynamically switching active BWPs, for example, on a slot by slot basis. In spectrum configuration 501, a UE 115 may operate according to a first BWP configuration in slot n. The downlink BWP 505-a and the uplink BWP 510-a may correspond to the same identifier, but different SCSs and different center frequencies in some examples.

The UE 115 may monitor downlink BWP 505-a while concurrently or simultaneously transmitting uplink transmissions in uplink BWP 510-a. The downlink BWP 505-a and the uplink BWP 510-a may be separated by guard band 515-a. In downlink BWP 505-a, the UE 115 may receive a downlink DCI 520. Downlink DCI 520 may indicate an active downlink BWP 505 change or an uplink BWP 510 change in a subsequent slot. The downlink DCI 520 in downlink BWP 505-a may indicate an active BWP change of uplink BWP 510-b in subsequent slot n+k. k may be an integer representing an offset from first slot n, such that slot n+k is a later slot. Uplink BWP 505-b may be indicated by an identifier different from the identifier for uplink BWP 510-a and downlink BWP 505-a. The identifier for uplink BWP 510-b may indicate a SCS and center frequency, such that the threshold guard band (e.g., guard band 515-a) is less than the spacing 525-a shown between downlink BWP 505-b and uplink BWP 510-a. Thus, spacing 525-a may satisfy a threshold guard band 515, and as such, uplink BWP 510-a may not need to be adjusted by the UE 115 for slot n+k. Based on the downlink DCI 520 in downlink BWP 505-a, UE 115 may determine to adjust the BWP configuration in slot n+k to include uplink BWP 510-b as indicated. The UE 115 may thus operate according to the BWPs shown in spectrum configuration 501.

In spectrum configuration 502, a UE 115 may operate according to first BWP configuration in slot n. Downlink BWP 505-a and uplink BWP 510-a may correspond to a same identifier, and different SCS and center frequencies in some examples. The UE 115 may monitor downlink BWP 505-a while concurrently or simultaneously transmitting uplink transmissions in uplink BWP 510-a. The downlink BWP 505-a and the uplink BWP 510-a may be separated by guard band 515-b. In downlink BWP 505-a, the UE 115 may receive a downlink DCI 520. Downlink DCI 520 may indicate an active downlink BWP 505 change or an uplink BWP 510 change in a subsequent slot. The downlink DCI 520 in downlink BWP 505-a may indicate an active BWP change of uplink BWP 510-b in subsequent slot n+k. Uplink BWP 505-b may be indicated by an identifier different from the identifier for uplink BWP 510-a and downlink BWP 505-a. The identifier for uplink BWP 510-b may indicate a SCS and center frequency, such that the threshold guard band (e.g., guard band 515-a) is greater than the spacing 525-b shown between downlink BWP 505-b and uplink BWP 510-a in first slot n+k. Thus, the potential guard band in first slot n+k does not satisfy a threshold guard band. Therefore, the change from active downlink BWP 505-a to downlink BWP 505-b also imposes a change in uplink BWP 510. That is, because the potential guard band in first slot n+k does not satisfy a threshold guard band, the change from active downlink BWP 505-a to downlink BWP 505-b may implicitly impose a change in one or more other BWPs such that the threshold guard band is satisfied. In this example, the change from active downlink BWP 505-a to downlink BWP 505-b also imposes a change from uplink BWP 510.

Thus, a UE 115 may dynamically adjust the active BWP configuration for uplink and downlink based on receiving an indication of a change to one or more BWPs, such as a downlink BWP 505. The UE 115 may adjust uplink BWP 510-a to change to uplink BWP 510-b. As shown in second slot n+k, the UE 115 may select a downlink BWP 505-b such that spacing 525-c between uplink BWP 510-b and downlink BWP 505-b satisfies a threshold guard band. The UE 115 may select uplink BWP 510-b by selecting an uplink BWP 510 that is paired with downlink BWP 505-b.

Based on the DCI in downlink BWP 505-a, UE 115 may determine to adjust the BWP configuration in second slot n+k to include uplink BWP 510-b and downlink BWP 505-b. The UE 115 may thus operate according to the BWPs shown in spectrum configuration 501.

In various examples, a UE 115 may receive a DCI 520 indicating an active change to an uplink BWP 510 in a slot n+k. The UE 115 may determine whether the active change to the uplink BWP 510 satisfies a threshold guard band. In cases where the guard band is not satisfied, the UE 115 may also adjust the downlink BWP 505 in the subsequent slot n+k.

Figure 6:
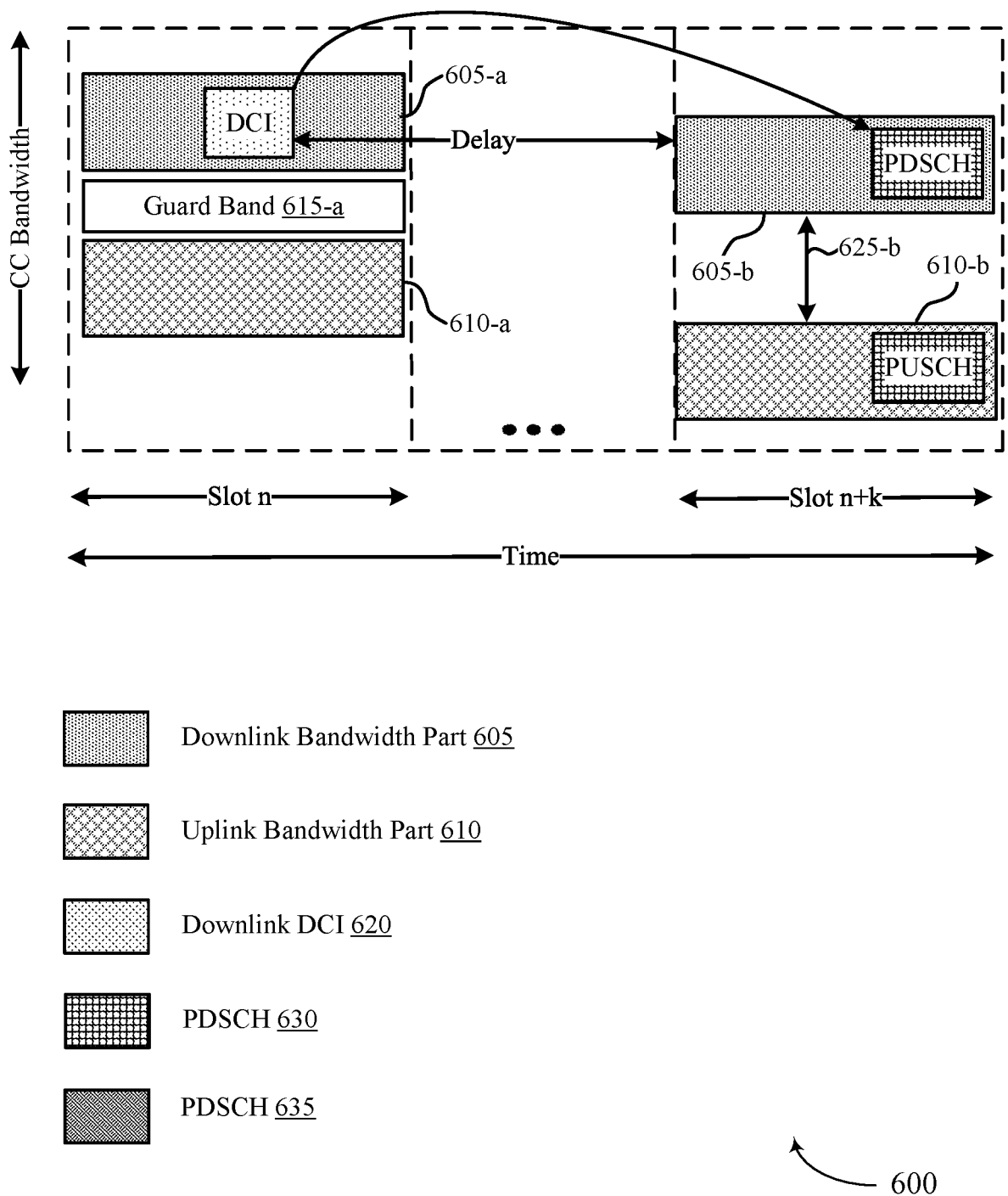
FIG. 6 illustrates an example of a spectrum configuration that supports dynamic BWP switching for full duplex operation in unpaired spectrum in accordance with aspects of the present disclosure.

FIG. 6 illustrates an example of a spectrum configuration 600 that supports dynamic BWP switching for full duplex operation in unpaired spectrum in accordance with aspects of the present disclosure. In some examples, spectrum configuration 600 may be implemented by aspects of wireless communications systems 100 and 200. A UE 115 and a base station 105 may communicate according to the spectrum configuration 600. A base station 105 may transmit an indication of spectrum configuration 600 in a BWP configuration indication. The BWP configuration shown in spectrum configuration 600 may include downlink BWPs 605 and uplink BWPs 610.

A UE 115 may indicate, to a base station 105, a capability of operating according to a full duplex (e.g., FDD) mode on a single carrier in an unpaired radio frequency spectrum. Based on this indication, the base station 105 may transmit a BWP configuration, including an indication of downlink BWPs 605, uplink BWPs 610, or both. In many cases, the BWP configuration may include an indication of a downlink BWP 605 corresponding to an identifier number, an uplink BWP 610 corresponding to an identifier, or both.

The UE 115 may receive the BWP configuration as indicated in DCI 620 within downlink BWP 605-a in slot n. The DCI 620 may include an indication of a downlink BWP 605 change, an uplink BWP 610 change, or both in subsequent slot n+k. The DCI 620 may also schedule a PDSCH 630 transmission in the subsequent slot n+k, or a PUSCH transmission 640 in slot n+k. The DCI 620 may also include a time domain resource assignment field, indicating a slot offset value for the PDSCH transmission 630 or the PUSCH transmission 640. The slot offset value for the slot for the PDSCH transmission 630 or the PUSCH transmission 640 may be smaller than a delay for which the UE 115 may be capable of adjusting the change from downlink BWP 605-*a* to downlink BWP 605-*b*, and to change the uplink BWP 610-*a* to uplink BWP 610-*b*.

In cases where DCI 620 schedules PDSCH transmission 630 by a base station 105 to a UE 115, the minimum delay ($T_{min}$) required for a UE 115 to adjust from the BWP configuration in slot n to the BWP configuration in slot n+k, as indicated by DCI 620, may be indicated by $$T_{\min} = \min\left(\left\lfloor m\frac{2^{\mu_{PUSCH}}}{2^{\mu_{PDSCH}}}\right\rfloor \left\lfloor \frac{2^{\mu_{PDSCH}}}{2^{\mu_{PUSCH}}}\right\rfloor, m\right).$$

In this equation, $$m = K_0 + \left\lfloor n\frac{2^{\mu_{PDSCH}}}{2^{\mu_{PDCCH}}}\right\rfloor,$$

where $K_0$ is a slot offset indicated in DCI 620, and may be based on a numerology of scheduled PDSCH transmission 630. n is the slot with the last scheduling DCI (e.g., slot n of spectrum configuration 600), and $\mu_{PDSCH}$ is the SCS of the new active downlink BWP 605-*b*; also indicated by the BWP configuration in 620. Further, $\mu_{PUSCH}$ is the SCS of the new active uplink BWP 610-*b*, and $\mu_{PDCCH}$ is the SCS of the scheduling DCI. The scheduling DCI may be DCI 620, or may be a DCI from another carrier (e.g., in the case of cross-carrier scheduling) not shown in FIG. 6.

In cases where DCI 620 schedules a PUSCH transmission 640 from a UE 115 to a base station 105, rather than a PDSCH transmission 630 by a base station 105 to a UE 115, the minimum delay ($T_{min}$) required for a UE 115 to adjust from the BWP configuration in slot n to the BWP configuration in slot n+k, as indicated by DCI 620, may be indicated by $$T_{\min} = \min\left(\left\lfloor m\frac{2^{\mu_{PDSCH}}}{2^{\mu_{PUSCH}}}\right\rfloor \left\lfloor \frac{2^{\mu_{PUSCH}}}{2^{\mu_{PDSCH}}}\right\rfloor, m\right).$$

In this equation, $$m = K_2 + \left\lfloor n\frac{2^{\mu_{PUSCH}}}{2^{\mu_{PDCCH}}}\right\rfloor,$$

where $K_2$ is a slot offset indicated in SCI 620, and may be based on a numerology of scheduled PUSCH transmission. n is the slot with the last scheduling DCI (e.g., slot n of spectrum configuration 600), and $\mu_{PDSCH}$ is the SCS of the new active uplink BWP 610-*b*, also indicated by the BWP configuration in 620. Further, $\mu_{PUSCH}$ is the SCS of the new active MVP 610-*b*, and $\mu_{PDCCH}$ is the SCS of DCI 620. DCI 620 may be transmitted by a base station 105, and DCI 620 may schedule PUSCH transmission 640. PUSCH transmission 640 may be transmitted by a UE 115 in uplink BWP 605-*b*.

Based on the calculation determination, a UE 115 may adjust downlink BWP 605-*a* to downlink BWP 605-*b*, or adjust uplink BWP 610-*a* to uplink BWP 610-*b*, or both, before the expiration of the minimum delay time. As shown above, the minimum delay time may vary based on whether a PDSCH transmission 630 is scheduled, or whether a PUSCH transmission 640 is scheduled by the DCI 620.

In various examples, the UE 115 may adjust the BWP configuration for slot n+k. In some cases, UE 115 may also determine whether the spacing 625-*b* between downlink BWP 605-*b* and an uplink BWP 610-*b* satisfies a threshold guard band 615. In cases where the threshold guard band is not satisfied, the UE 115 may further adjust either the downlink BWP 605 or the uplink BWP 610, as described with respect to FIG. 5.

Based on performing the BWP configuration adjustment, the UE 115 and the base station 105 may communicate according to the updated BWP configuration in slot n+k. This may include the UE 115 transmitting PUSCH transmission 640, receiving PDSCH transmission 630, or both, in a full-duplex communication mode.

Figure 7:
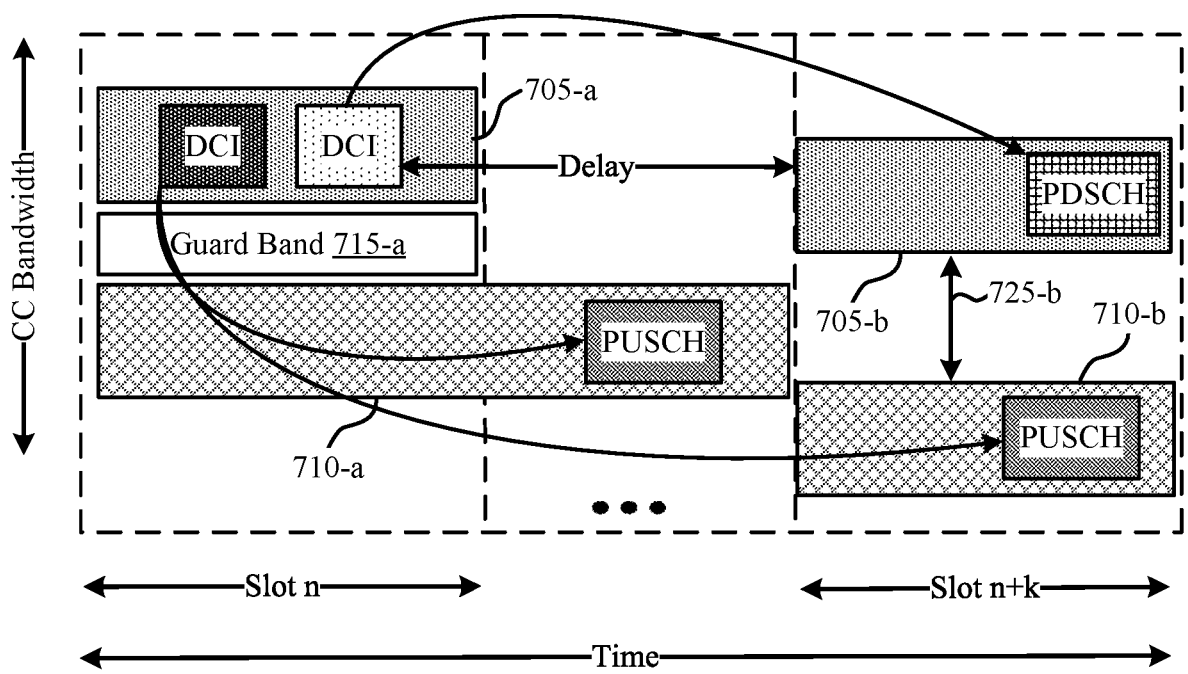
FIG. 7 illustrates an example of a spectrum configuration that supports dynamic BWP switching for full duplex operation in unpaired spectrum in accordance with aspects of the present disclosure.

FIG. 7 illustrates an example of a spectrum configuration 700 that supports dynamic BWP switching for full duplex operation in unpaired spectrum in accordance with aspects of the present disclosure. In some examples, spectrum configuration 700 may be implemented by aspects of wireless communications systems 100 and 200. A UE 115 and a base station 105 may communicate according to the spectrum configuration 700. A base station 105 may transmit an indication of spectrum configuration 700 in a BWP configuration indication. The BWP configuration shown in spectrum configuration 700 may include downlink BWPs 705 and uplink BWPs 710.

A UE 115 may indicate, to a base station 105, a capability of operating according to a full duplex (e.g., FDD) mode on a single carrier in an unpaired radio frequency spectrum. Based on this indication, the base station 105 may transmit a BWP configuration, including an indication of downlink BWPs 705, uplink BWPs 710, or both. In many cases, the BWP configuration may include an indication of a downlink BWP 705 corresponding to an identifier number, an uplink BWP 710 corresponding to an identifier, or both.

The UE 115 may receive the BWP configuration as indicated in a downlink DCI 720 within downlink BWP 705-*a* in slot n. Or, the UE 115 may receive the BWP configuration in an uplink DCI 735. A base station 105 may transmit the downlink DCI 720, indicating the BWP configuration. A base station 105 may also transmit the uplink DCI 735, indicating the BWP configuration. In the case of the BWP configuration indicated in downlink DCI 720, downlink DCI 720 may indicate an active BWP change for both downlink BWP 705 and uplink BWP 710. In this case, the UE 115 may not receive or transmit in the cell during a time duration from the end of a PDCCH carrying downlink DCI 720, until the beginning of a slot indicated by a slot offset value in a time domain resource assignment field in downlink DCI 720. Downlink DCI 720 may indicate an active BWP change in downlink BWP 705 and uplink BWP 710 in slot n+k. Downlink DCI 720 may also schedule PDSCH 730 in slot n+k. Thus, a UE 115 may drop communications between the end of downlink DCI 720 until the start of slot n+k (as shown by delay). For example, PUSCH 740 in uplink BWP 710-*a* may be not performed or dropped.

In the case of the BWP configuration indicated in uplink DCI 735, uplink DCI 735 may indicate an active BWP change for both downlink BWP 705 and uplink BWP 710. In this case, the UE 115 may not receive or transmit in the cell during a time duration from the end of a PDCCH carrying uplink DCI 735, until the beginning of a slot indicated by a slot offset value in a time domain resource assignment field in downlink DCI 720. Uplink DCI 735 may indicate an active BWP change in downlink BWP 705 and uplink BWP 710 in slot n+k. Uplink DCI 735 may also schedule PUSCH 740 in slot n+k. Thus, a UE 115 may drop communications between the end of uplink DCI 735 until the start of slot n+k. For example, PUSCH 740 in uplink BWP 710-*a* may be not performed and may be dropped.

Additionally or alternatively, a UE 115 may determine a priority level of potential communications that could be dropped and may determine whether to drop one or more communications (e.g., scheduled or unscheduled) or whether to perform the one or more communications based on the priority. For example, the UE 115 may determine that a priority level of either downlink DCI 720 or uplink DCI 735 is different than (e.g., lower than) a priority level of PUSCH 740 in uplink BWP 710-*a*. If the priority level of the downlink DCI 720 or the uplink DCI 735 is relatively lower, for example, the UE may be configured such that any switching to one or more new active BWPs (e.g., downlink BWP 705-*b* or uplink BWP 710-*b*) may have a same priority or a related priority (that may also be relatively lower) compared to a scheduled communication (e.g., PUSCH 740) that may have a relatively higher priority. For example, PUSCH 740 in uplink BWP 710-*a* may include a low-latency communication, such as an ultra-reliable low-latency communication, and UE 115-*a* may determine to transmit PUSCH 740 in uplink BWP 710-*a* rather than performing lower priority alternative communications. Therefore, the UE 115 may determine to transmit PUSCH 740 in uplink BWP 710-*a* as scheduled, for example based on PUSCH 740 being higher priority, rather than dropping PUSCH 740.

Figure 8:
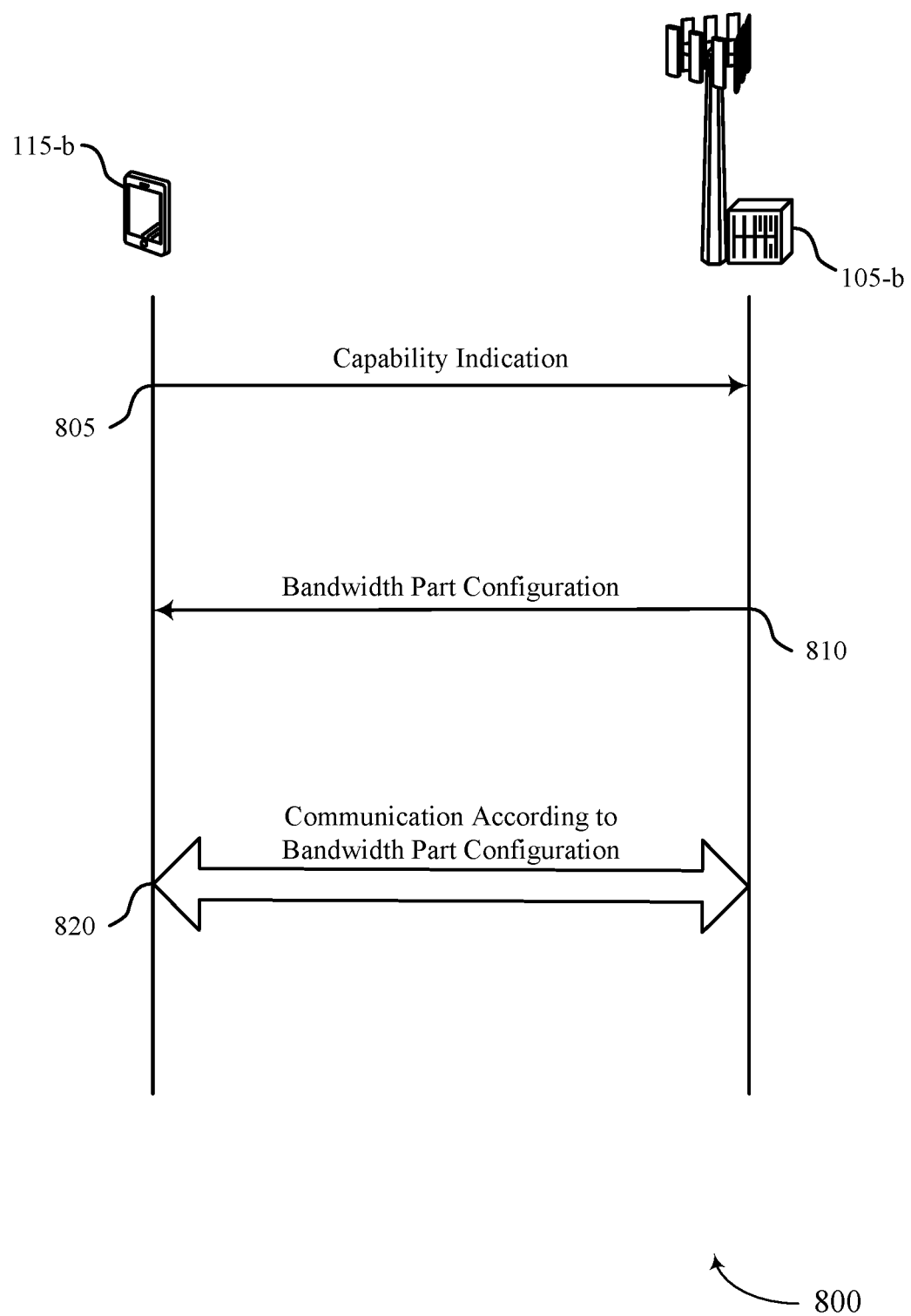
FIG. 8 illustrates an example of a process flow that supports dynamic BWP switching for full duplex operation in unpaired spectrum in accordance with aspects of the present disclosure.

FIG. 8 illustrates an example of a process flow 800 that supports dynamic BWP switching for full duplex operation in unpaired spectrum in accordance with aspects of the present disclosure. In some examples, process flow 800 may implement aspects of wireless communications systems 100 and 200, as well as spectrum configurations 300, 400, 500, 600, and 700. Process flow 800 includes UE 115-*b* which may be an example of a UE 115 as described with respect to wireless communications system 100 and 200. Process flow 800 also includes base station 105-*b* which may be an example of a base station 105 as described with respect to wireless communications system 100 and 200. UE 115-*b* and base station 105-*b* may communicate according to a spectrum configuration in a CC, as shown in spectrum configurations 300-700.

At 805, UE 115-*b* may transmit an indication of a capability of UE 115-*b* to operate in a DFF mode on a single carrier in an unpaired radio frequency spectrum based on a first BWP configuration. The first BWP configuration may have been previously configured at UE 115-*b* based on previous signaling from a base station (e.g., base station 105-*b*). In some cases, UE 115-*b* may transmit an indication of a capability of UE 115-*b* to operate in a sub-band full-duplex mode. In other cases, UE 115-*b* may transmit an indication of a capability of UE 115-*b* to operate in a half-duplex mode.

At 810, UE 115-*b* may receive an indication of a second BWP configuration for one or more slots of a set of slots. The indication of the second BWP configuration may be based on transmitting the indication of the capability of UE 115-*b*. The second BWP configuration may include a configuration associated with an uplink BWP and a downlink BWP.

In either case of UE 115-*b* having a capability to operate in a sub-band full-duplex mode of a half duplex mode, UE 115-*b* may receive different possible BWP configurations. In some cases, UE 115-*b* may receive an indication that the uplink BWP and the downlink BWP have different BWP identifiers, different SCSs, or both. In some cases, UE 115-*b* may receive an indication that the uplink BWP and the downlink BWP have one or more same BWP identifiers, and one or more of different SCSs of different center frequencies. In some cases, UE 115-*b* may receive an indication that the uplink BWP and the downlink BWP have one or more same BWP identifiers, and one or more of one or more same SCSs or one or more same center frequencies.

In cases where UE 115-*b* has a capability to operate in a sub-band full-duplex mode, UE 115-*b* may receive different indications of the second BWP configuration. In some cases, UE 115-*b* may receive an indication of a guard band between the uplink BWP and the downlink BWP, the indication of the guard band indicating that the guard band is greater than a threshold guard band level.

In some cases, UE 15-*b* may receive DCI. The DCI may include the BWP configuration at 810. In some of these cases, UE 115-*b* may receive DCI indicating a change of an active BWP, the active BWP corresponding to one of the uplink BWP or the downlink BWP, based on a guard band between the uplink BWP and the downlink BWP being less than a threshold guard band. UE 115-*b* may then adjust, based on the DCI, one of the uplink BWP or the downlink BWP, such that the guard band between the uplink BWP and the downlink BWP are greater than the threshold. Further, UE 115-*b* may also receive a downlink DCI (e.g., scheduling downlink transmissions to UE 115-*b*) indicating a change in a downlink BWP. UE 115-*b* may adjust, based on the downlink DCI, the downlink BWP and an uplink BWP. In some cases, UE 115-*b* may receive an uplink DCI from base station 105-*b* (e.g., scheduling uplink transmissions by UE 115-*b*) indicating a change in an uplink BWP. UE 115-*b* may then adjust, based on the uplink DCI, the uplink BWP and the downlink BWP. The uplink BWP and the downlink BWP may each correspond to different BWP identifiers based on adjust the uplink BWP or the downlink BWP. Thus, UE 115-*b* may adjust both the uplink BWP and the downlink BWP based on receiving a change in the active BWP for either the uplink BWP or the downlink BWP.

In some cases, UE 115-*b* may receive DCI indicating a change of an active BWP corresponding to one of the uplink BWP or the downlink BWP based on a guard band between the uplink BWP and the downlink BWP being less than a threshold guard band. The DCI may include the BWP configuration at 810. UE 115-*b* may then adjust, based on the DCI, the uplink BWP and the downlink BWP such that the guard band between the uplink BWP and the downlink BWP are greater than the threshold guard band. In these cases, the uplink BWP and the downlink BWP may have the same BWP, based on adjusting the uplink BWP and the downlink BWP.

In some cases, UE 115-*b* may receive DCI indicating a change of active BWPs corresponding to both of the uplink BWP and the downlink BWP, and also indicating a slot offset value for a downlink reception or an uplink transmission. The slot offset value may be smaller than a delay for UE 115-*b* to adjust the uplink BWP and the downlink BWP before an expiration of the slot offset value.

In some cases, UE 115-*b* may receive DCI, where the DCI includes a scheduling DCI corresponding to a downlink DCI or an uplink DCI. Base station 105-*b* may transmit the downlink DCI, where the downlink DCI may schedule downlink transmissions or a downlink BWP change, or both. Base station 105-*b* may also transmit the uplink DCI, which may schedule uplink transmissions, or an uplink BWP change, or both.

The DCI may also indicate a change of active BWPs corresponding to both of the uplink BWP and the downlink BWP, and indicating a slot offset value for a downlink reception or an uplink transmission. In some cases, at 815, UE 115-*b* may refrain from communicating during a duration after receiving the DCI until a slot indicated by the slot offset value. In some cases, UE 115-*b* may determine that a priority of the DIC is lower than a priority of a communication scheduled during a duration after receiving the DIC until a slot indicated by the slot offset value. UE 115-*b* may then, at 815, perform the communication scheduled, based on determining that the priority of the DCI is lower than the priority of the communication.

In some cases, UE 115-*b* may receive DCI indicating a change of active BWPs corresponding to both of the uplink BWP and the downlink BWP, and indicating a slot offset value for a downlink reception or an uplink transmission. The DCI may include the BWP configuration at 810. In some cases, at 815, UE 115-*b* may refrain from communicating a communication scheduled during a duration after receiving the DCI, until a slot indicated by the slot offset value, the slot indicated by the offset value corresponding to a slot in which the change of the active BWPs is to occur. In other cases, UE 115-*b* may refrain from communicating a communication scheduled during a duration after receiving a second DCI received after the DCI, and until a slot indicated by the slot offset value, the slot indicted by the offset value corresponding to a slot in which the change of the active BWPs is to occur.

In some cases, UE 115-*b* may receive DCI, indicating a change of active BWPs corresponding to both of the uplink BWP and the downlink BWP, and indicating a different BWP identifier for each of the uplink BWP and the downlink BWP.

At 815, UE 115-*b* may communicate with base station 105-*b* according to the second BWP configuration in the one or more slots of the set of slots. The communicating may be based on receiving the indication of the second BWP configuration.

Figure 9:
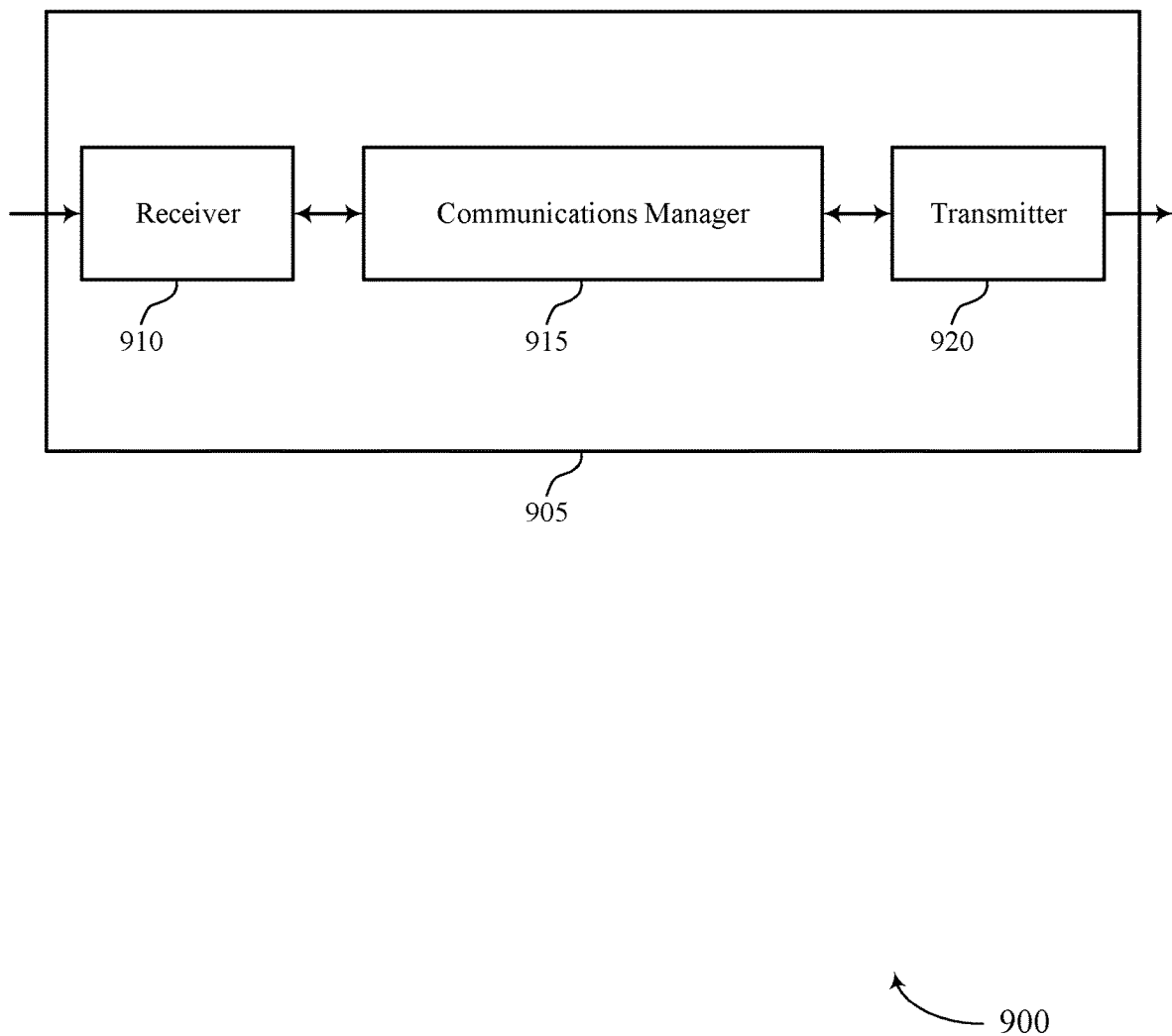
FIGS. 9 and 10 show block diagrams of devices that support dynamic BWP switching for full duplex operation in unpaired spectrum in accordance with aspects of the present disclosure.

FIG. 9 shows a block diagram 900 of a device 905 that supports dynamic BWP switching for full duplex operation in unpaired spectrum in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to dynamic BWP switching for full duplex operation in unpaired spectrum, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit an indication of a capability of the UE to operate in a full duplex mode on a single carrier in an unpaired radio frequency spectrum based on a first BWP configuration. The communications manager 915 may receive an indication of a second BWP configuration for one or more slots of a set of slots based on transmitting the indication of the capability of the UE, the second BWP configuration including a configuration associated with an uplink BWP and a downlink BWP. The communications manager 915 may communicate according to the second BWP configuration in the one or more slots of the set of slots based on receiving the indication of the second BWP configuration. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

In some examples, the communications manager 915 described herein may be implemented as a chipset of a wireless modem, and the receiver 910 and the transmitter 920 may be implemented as sets of analog components (e.g., amplifiers, filters, phase shifters, antennas, etc.) The wireless modem may obtain and decode signals from the receiver 910 over a receive interface, and may output signals for transmission to the transmitter 920 over a transmit interface.

The actions performed by the communications manager 915 as described herein may be implemented to realize one or more potential advantages. One implementation may allow a UE 115 to save power and increase battery life by improving dynamic BWP adjustments. Rather than experiencing delays or interference due to BWP configurations, a UE 115 may be able to update BWP configuration to avoid interference, particularly when operating in sub-band full-duplex mode.

Figure 10:
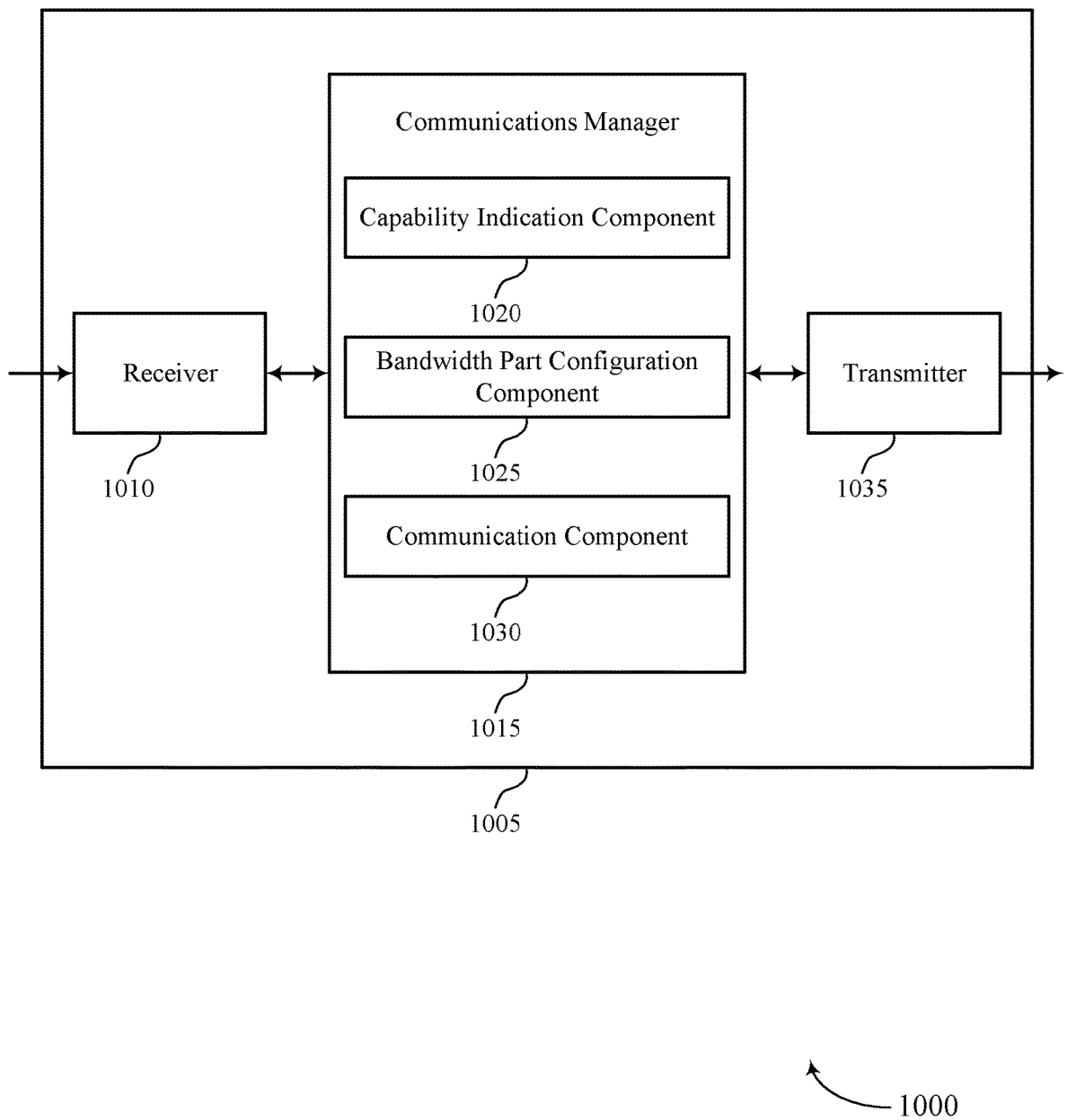

FIG. 10 shows a block diagram 1000 of a device 1005 that supports dynamic BWP switching for full duplex operation in unpaired spectrum in accordance with aspects of the present disclosure. The device 1005 may be an example of aspects of a device 905, or a UE 115 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to dynamic BWP switching for full duplex operation in unpaired spectrum, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a capability indication component 1020, a BWP configuration component 1025, and a communication component 1030. The communications manager 1015 may be an example of aspects of the communications manager 1210 described herein.

The capability indication component 1020 may transmit an indication of a capability of the UE to operate in a full duplex mode on a single carrier in an unpaired radio frequency spectrum based on a first BWP configuration.

The BWP configuration component 1025 may receive an indication of a second BWP configuration for one or more slots of a set of slots based on transmitting the indication of the capability of the UE, the second BWP configuration including a configuration associated with an uplink BWP and a downlink BWP.

The communication component 1030 may communicate according to the second BWP configuration in the one or more slots of the set of slots based on receiving the indication of the second BWP configuration.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

A processor of a UE 115 (e.g., controlling the receiver 1010, the transmitter 1035, or the transceiver 1220 as described with reference to FIG. 12) may operate the components described herein to realize one or more potential advantages. The processor of the UE 115 may operate the transmitter 1035 to transmit an indication of a capability of the UE 115 to operate in a full duplex (e.g., FDD) mode on a single carrier. The processor of the UE 115 may also operate the receiver 1035 to receive a BWP configurations from a base station 105. The processor of the UE 115 may then dynamically adjust active uplink BWPs and downlink BWPs, in order to improve communications reliability by decreasing interference between active BWPs. The processor may also improve efficiency of the UE 115 by utilizing fewer communications resources in communications with a base station 105.

Figure 11:
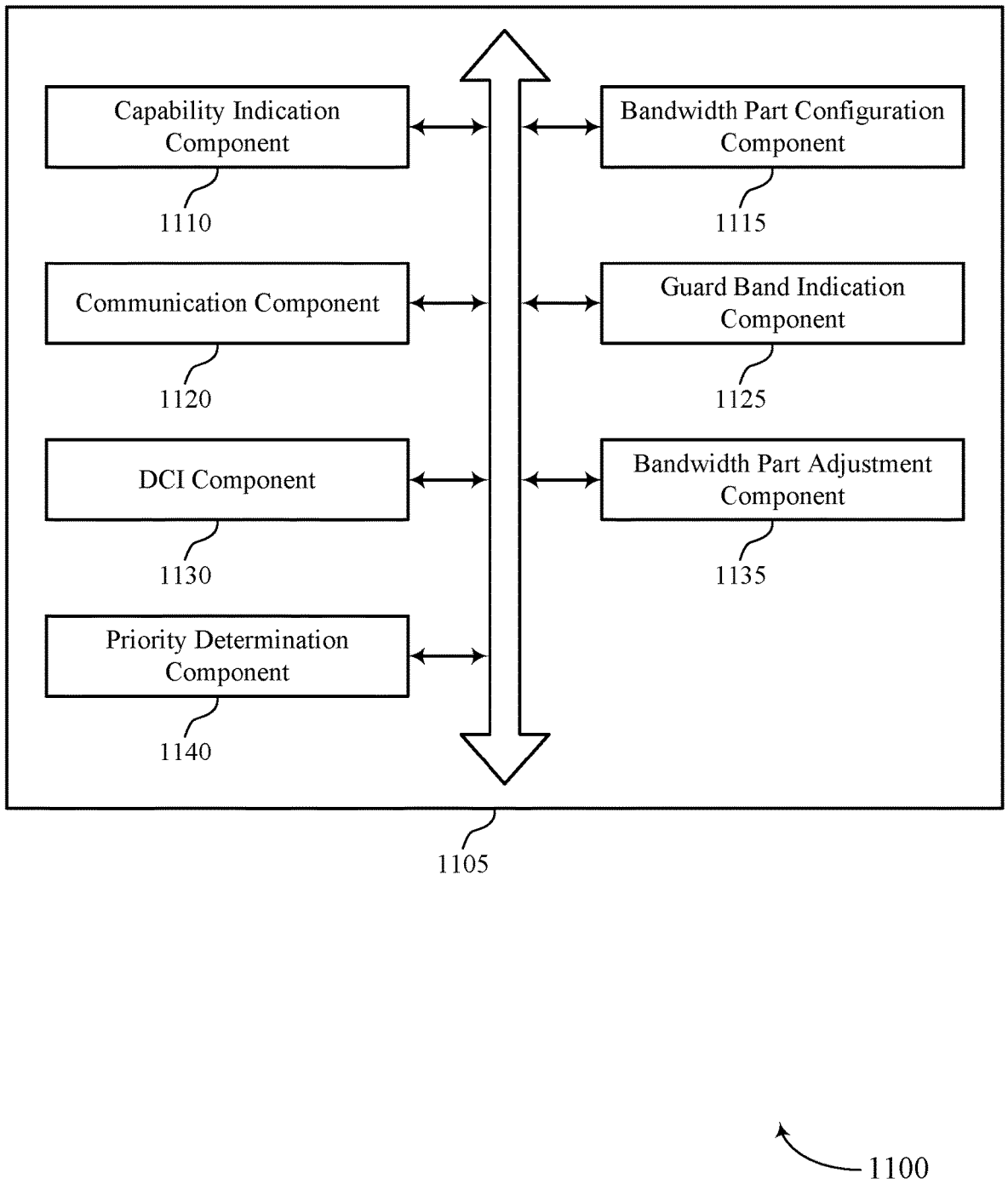
FIG. 11 shows a block diagram of a communications manager that supports dynamic BWP switching for full duplex operation in unpaired spectrum in accordance with aspects of the present disclosure.

FIG. 11 shows a block diagram 1100 of a communications manager 1105 that supports dynamic BWP switching for full duplex operation in unpaired spectrum in accordance with aspects of the present disclosure. The communications manager 1105 may be an example of aspects of a communications manager 915, a communications manager 1015, or a communications manager 1210 described herein. The communications manager 1105 may include a capability indication component 1110, a BWP configuration component 1115, a communication component 1120, a guard band indication component 1125, a DCI component 1130, a BWP adjustment component 1135, and a priority determination component 1140. Each of these modules may communicate, directly or indirectly, with one another (e.g., via one or more buses).

The capability indication component 1110 may transmit an indication of a capability of the UE to operate in a full duplex mode on a single carrier in an unpaired radio frequency spectrum based on a first BWP configuration.

In some examples, the capability indication component 1110 may transmit an indication of a capability of the UE to operate in a sub-band full-duplex mode.

In some examples, the capability indication component 1110 may transmit a capability of the UE to operate in a half-duplex mode.

The BWP configuration component 1115 may receive an indication of a second BWP configuration for one or more slots of a set of slots based on transmitting the indication of the capability of the UE, the second BWP configuration including a configuration associated with an uplink BWP and a downlink BWP.

In some examples, the BWP configuration component 1115 may receive an indication that the uplink BWP and the downlink BWP have different BWP identifiers, different SCSs, or both.

In some examples, the BWP configuration component 1115 may receive an indication that the uplink BWP and the downlink BWP have one or more same BWP identifiers, and one or more of different SCSs or different center frequencies.

In some examples, the BWP configuration component 1115 may receive an indication that the uplink BWP and the downlink BWP have one or more same BWP identifiers, and one or more of one or more same SCSs or one or more same center frequencies.

The communication component 1120 may communicate according to the second BWP configuration in the one or more slots of the set of slots based on receiving the indication of the second BWP configuration.

In some examples, the communication component 1120 may refrain from communicating during a duration after receiving the DCI until a slot indicated by the slot offset value.

In some examples, the communication component 1120 may perform the communication scheduled based on determining that the priority of the DCI is lower than the priority of the communication.

In some examples, the communication component 1120 may refrain from communicating a communication scheduled during a duration after receiving the DCI until a slot indicated by the slot offset value, the slot indicated by the offset value corresponding to a slot in which the change of the active BWPs is to occur.

In some examples, the communication component 1120 may refrain from communicating a communication scheduled during a duration after receiving a second DCI received after the DCI and until a slot indicated by the slot offset value, the slot indicated by the offset value corresponding to a slot in which the change of the active BWPs is to occur.

The guard band indication component 1125 may receive an indication of a guard band between the uplink BWP and the downlink BWP, the indication of the guard band indicating that the guard band is greater than a threshold.

The DCI component 1130 may receive DCI indicating a change of an active BWP corresponding to one of the uplink BWP or the downlink BWP based on a guard band between the uplink BWP and the downlink BWP being less than a threshold.

In some examples, the DCI component 1130 may receive a downlink DCI indicating a change in a downlink BWP.

In some examples, the DCI component 1130 may receive an uplink DCI indicating a change in an uplink BWP.

In some examples, the DCI component 1130 may where the uplink BWP and the downlink BWP each correspond to different BWP identifiers based on adjusting the one of the uplink BWP or the downlink BWP.

In some examples, the DCI component 1130 may receive DCI indicating a change of active BWPs corresponding to both of the uplink BWP and the downlink BWP and indicating a slot offset value for a downlink reception or an uplink transmission, the slot offset value being smaller than a delay for the UE to adjust the uplink BWP and the downlink BWP.

In some examples, receiving the DCI includes receiving a scheduling DCI corresponding to a downlink DCI or an uplink DCI.

In some examples, the DCI component 1130 may receive DCI indicating a change of active BWPs corresponding to both of the uplink BWP and the downlink BWP and indicating a slot offset value for a downlink reception or an uplink transmission.

In some examples, the DCI component 1130 may receive DCI indicating a change of active BWPs corresponding to both of the uplink BWP and the downlink BWP and indicating a slot offset value for a downlink reception or an uplink transmission.

In some examples, the DCI component 1130 may receive DCI indicating a change of active BWPs corresponding to both of the uplink BWP and the downlink BWP and indicating a different BWP identifier for each of the uplink BWP and the downlink BWP.

The BWP adjustment component 1135 may adjust, based on the DCI, one of the uplink BWP or the downlink BWP such that the guard band between the uplink BWP and the downlink BWP are greater than the threshold.

In some examples, the BWP adjustment component 1135 may adjust, based at least in part in the downlink DCI, the downlink BWP and an uplink BWP.

In some examples, the BWP adjustment component 1135 may adjust, based at least in part in the uplink DCI, the uplink BWP and a downlink BWP.

In some examples, the BWP adjustment component 1135 may adjust, based on DCI, the uplink BWP and the downlink BWP such that the guard band between the uplink BWP and the downlink BWP are greater than the threshold.

In some examples, the BWP adjustment component 1135 may adjust, based on DCI, the uplink BWP and the downlink BWP before an expiration of the slot offset value.

In some cases, the uplink BWP and the downlink BWP have a same BWP identifier based on adjusting the uplink BWP and the downlink BWP.

The priority determination component 1140 may determine that a priority of the DCI is lower than a priority of a communication scheduled during a duration after receiving the DCI until a slot indicated by the slot offset value.

Figure 12:
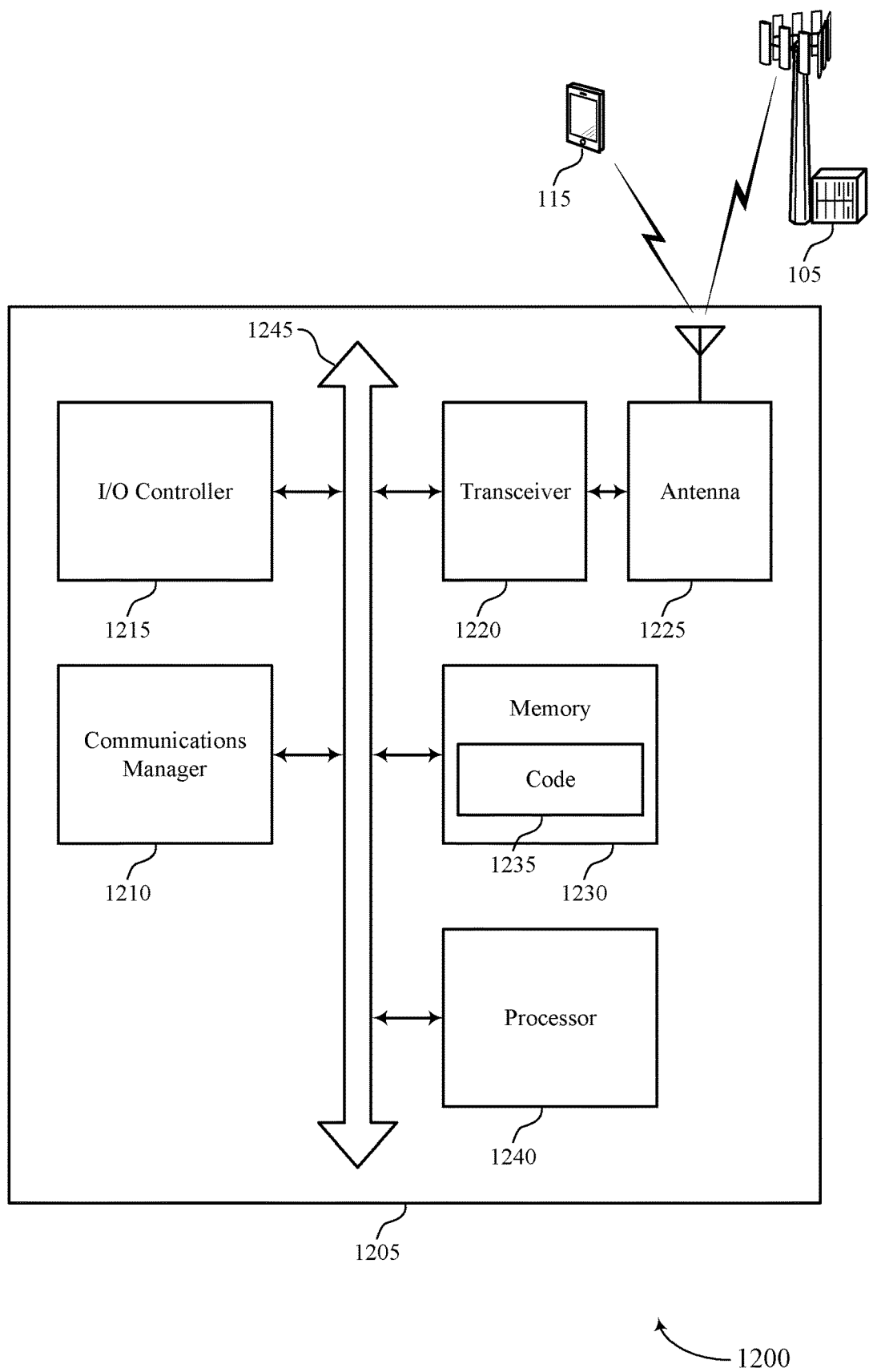
FIG. 12 shows a diagram of a system including a device that supports dynamic BWP switching for full duplex operation in unpaired spectrum in accordance with aspects of the present disclosure.

FIG. 12 shows a diagram of a system 1200 including a device 1205 that supports dynamic BWP switching for full duplex operation in unpaired spectrum in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may transmit an indication of a capability of the UE to operate in a full duplex mode on a single carrier in an unpaired radio frequency spectrum based on a first BWP configuration. The communications manager 1210 may receive an indication of a second BWP configuration for one or more slots of a set of slots based on transmitting the indication of the capability of the UE, the second BWP configuration including a configuration associated with an uplink BWP and a downlink BWP. The communications manager 1210 may communicate according to the second BWP configuration in the one or more slots of the set of slots based on receiving the indication of the second BWP configuration.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting dynamic BWP switching for full duplex operation in unpaired spectrum).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
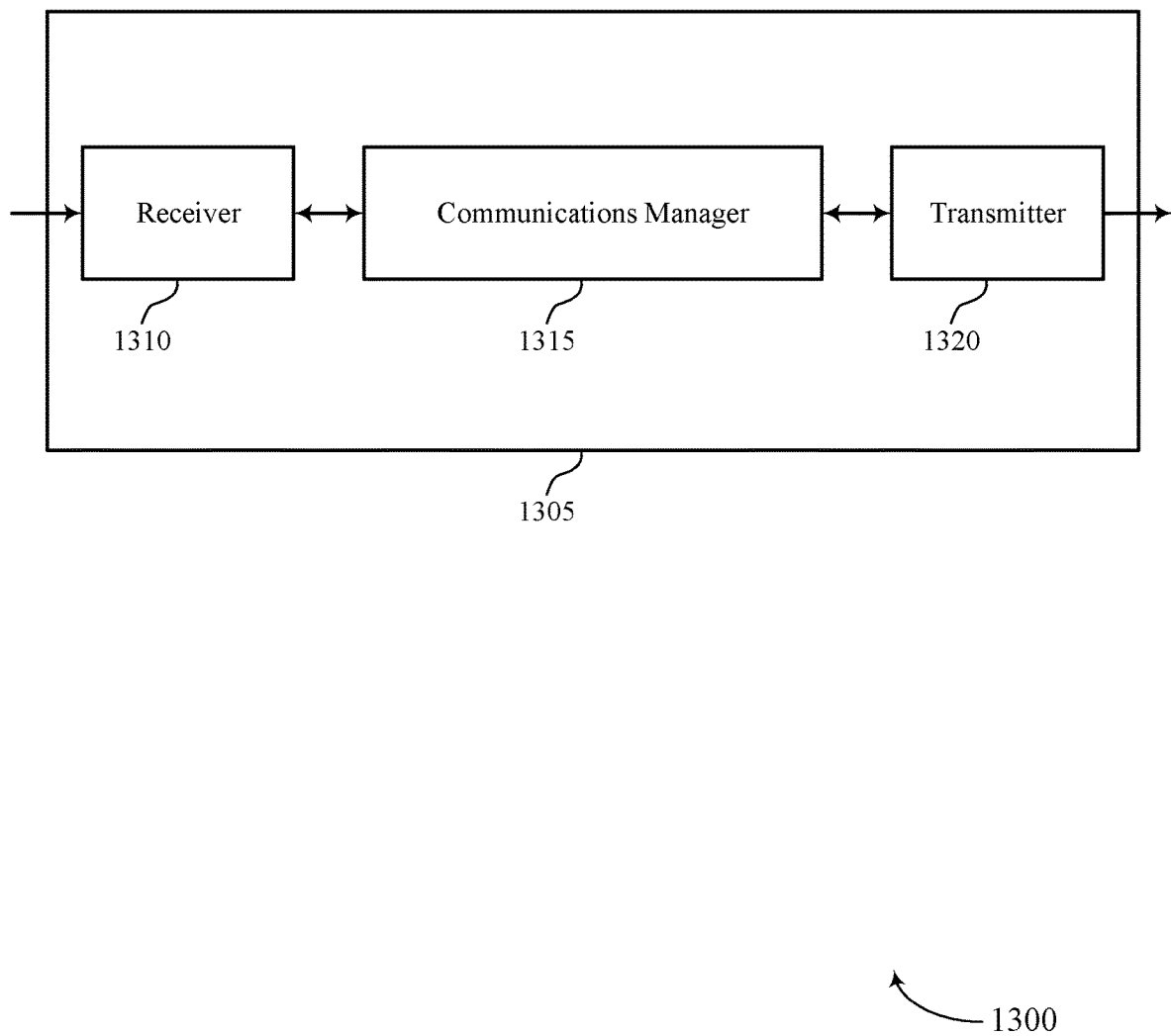
FIGS. 13 and 14 show block diagrams of devices that support dynamic BWP switching for full duplex operation in unpaired spectrum in accordance with aspects of the present disclosure.

FIG. 13 shows a block diagram 1300 of a device 1305 that supports dynamic BWP switching full duplex operation in unpaired spectrum in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to dynamic BWP switching for full duplex operation in unpaired spectrum, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may receive an indication of a capability of a UE to operate in a full duplex mode on a single carrier in an unpaired radio frequency spectrum based on a first BWP configuration. The communications manager 1315 may transmit an indication of a second BWP configuration for one or more slots of a set of slots based on receiving the indication of the capability of the UE, the second BWP configuration including a configuration associated with an uplink BWP and a downlink BWP. The communications manager 1315 may communicate with the UE according to the second BWP configuration in the one or more slots of the set of slots based on transmitting the indication of the second BWP configuration. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
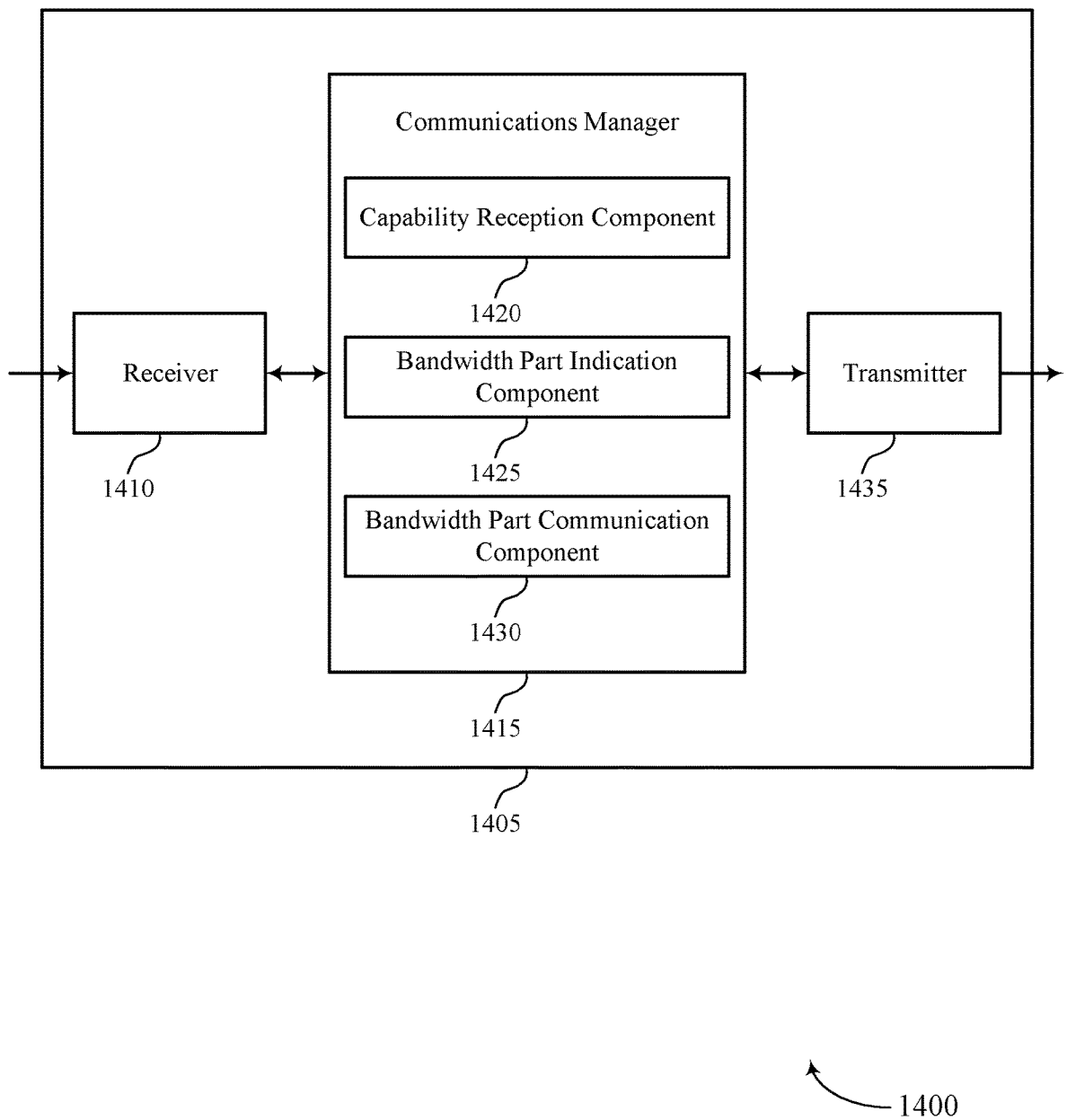

FIG. 14 shows a block diagram 1400 of a device 1405 that supports dynamic BWP switching for full duplex operation in unpaired spectrum in accordance with aspects of the present disclosure. The device 1405 may be an example of aspects of a device 1305, or a base station 105 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to dynamic BWP switching for full duplex operation in unpaired spectrum, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a capability reception component 1420, a BWP indication component 1425, and a BWP communication component 1430. The communications manager 1415 may be an example of aspects of the communications manager 1610 described herein.

The capability reception component 1420 may receive an indication of a capability of a UE to operate in a full duplex mode on a single carrier in an unpaired radio frequency spectrum based on a first BWP configuration.

The BWP indication component 1425 may transmit an indication of a second BWP configuration for one or more slots of a set of slots based on receiving the indication of the capability of the UE, the second BWP configuration including a configuration associated with an uplink BWP and a downlink BWP.

The BWP communication component 1430 may communicate with the UE according to the second BWP configuration in the one or more slots of the set of slots based on transmitting the indication of the second BWP configuration.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
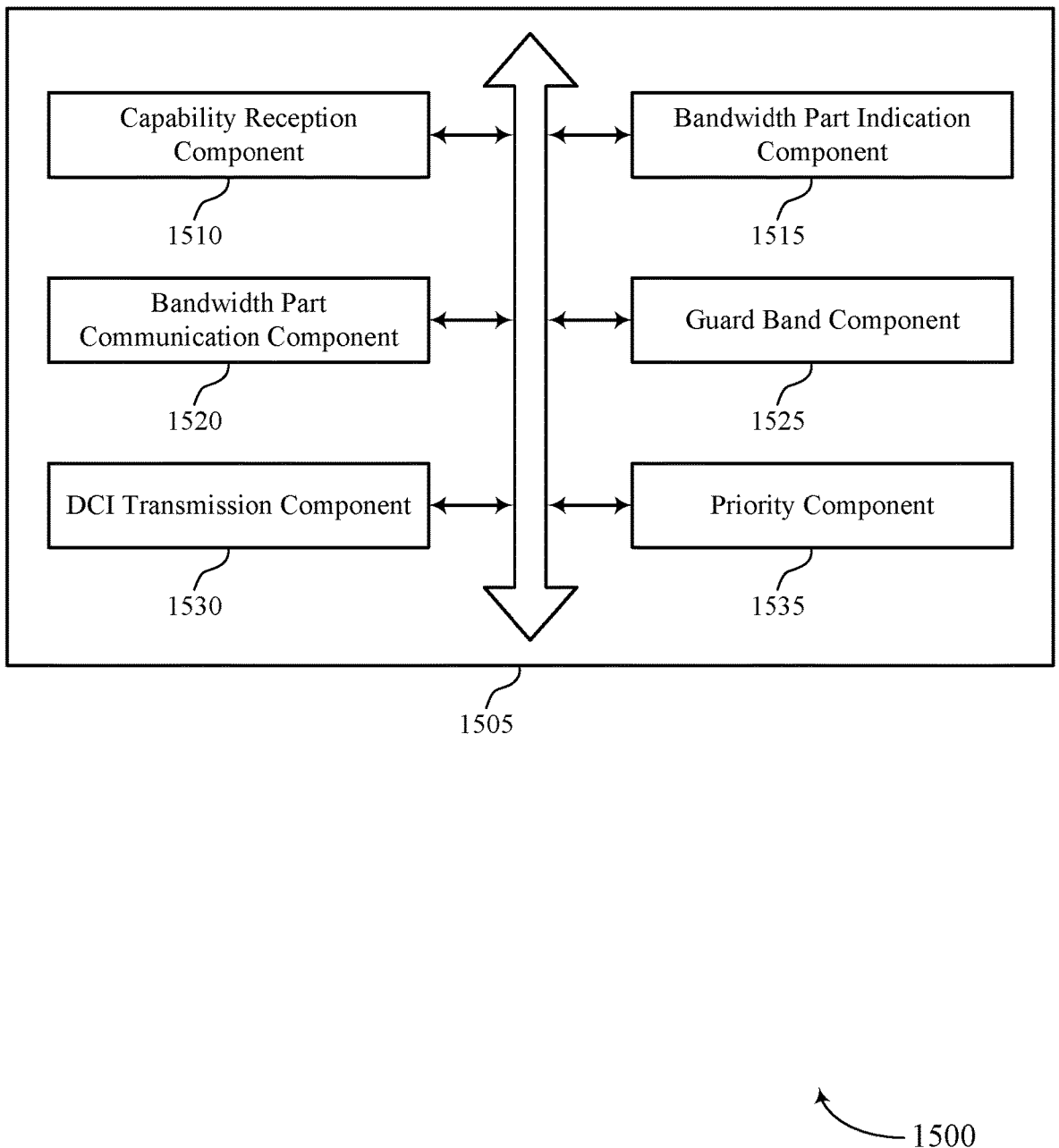
FIG. 15 shows a block diagram of a communications manager that supports dynamic BWP switching for full duplex operation in unpaired spectrum in accordance with aspects of the present disclosure.

FIG. 15 shows a block diagram 1500 of a communications manager 1505 that supports dynamic BWP switching for full duplex operation in unpaired spectrum in accordance with aspects of the present disclosure. The communications manager 1505 may be an example of aspects of a communications manager 1315, a communications manager 1415, or a communications manager 1610 described herein. The communications manager 1505 may include a capability reception component 1510, a BWP indication component 1515, a BWP communication component 1520, a guard band component 1525, a DCI transmission component 1530, and a priority component 1535. Each of these modules may communicate, directly or indirectly, with one another (e.g., via one or more buses).

The capability reception component 1510 may receive an indication of a capability of a UE to operate in a full duplex mode on a single carrier in an unpaired radio frequency spectrum based on a first BWP configuration.

In some examples, the capability reception component 1510 may receive an indication of a capability of the UE to operate in a sub-band full-duplex mode.

In some examples, the capability reception component 1510 may receive a capability of the UE to operate in a half-duplex mode.

The BWP indication component 1515 may transmit an indication of a second BWP configuration for one or more slots of a set of slots based on receiving the indication of the capability of the UE, the second BWP configuration including a configuration associated with an uplink BWP and a downlink BWP.

In some examples, the BWP indication component 1515 may transmit an indication that the uplink BWP and the downlink BWP have different BWP identifiers, different SCSs, or both.

In some examples, the BWP indication component 1515 may transmit an indication that the uplink BWP and the downlink BWP have one or more same BWP identifiers, and one or more of different SCSs or different center frequencies.

In some examples, the BWP indication component 1515 may transmit an indication that the uplink BWP and the downlink BWP have one or more same BWP identifiers, and one or more of one or more same SCSs or one or more same center frequencies.

The BWP communication component 1520 may communicate with the UE according to the second BWP configuration in the one or more slots of the set of slots based on transmitting the indication of the second BWP configuration.

In some examples, the BWP communication component 1520 may perform the communication scheduled based on determining that the priority of the DCI is lower than the priority of the communication.

The guard band component 1525 may transmit an indication of a guard band between the uplink BWP and the downlink BWP, the indication of the guard band indicating that the guard band is greater than a threshold.

The DCI transmission component 1530 may transmit DCI indicating a change of an active BWP corresponding to one of the uplink BWP or the downlink BWP based on a guard band between the uplink BWP and the downlink BWP being less than a threshold.

In some examples, the DCI transmission component 1530 may transmit a downlink DCI indicating a change in a downlink BWP.

In some examples, the DCI transmission component 1530 may transmit an uplink DCI indicating a change in an uplink BWP.

In some examples, the DCI transmission component 1530 may transmit DCI indicating a change of active BWPs corresponding to both of the uplink BWP and the downlink BWP and indicating a slot offset value for a downlink reception or an uplink transmission, the slot offset value being smaller than a delay for the UE to adjust the uplink BWP and the downlink BWP.

In some examples, transmitting the DCI includes transmitting a scheduling DCI corresponding to a downlink DCI or an uplink DCI.

In some examples, the DCI transmission component 1530 may transmit DCI indicating a change of active BWPs corresponding to both of the uplink BWP and the downlink BWP and indicating a slot offset value for a downlink reception or an uplink transmission.

In some examples, the DCI transmission component 1530 may transmit DCI indicating a change of active BWPs corresponding to both of the uplink BWP and the downlink BWP and indicating a different BWP identifier for each of the uplink BWP and the downlink BWP.

In some cases, the uplink BWP and the downlink BWP each correspond to different BWP identifiers.

In some cases, the uplink BWP and the downlink BWP have a same BWP identifier.

The priority component 1535 may determine that a priority of the DCI is lower than a priority of a communication scheduled during a duration after receiving the DCI until a slot indicated by the slot offset value.

Figure 16:
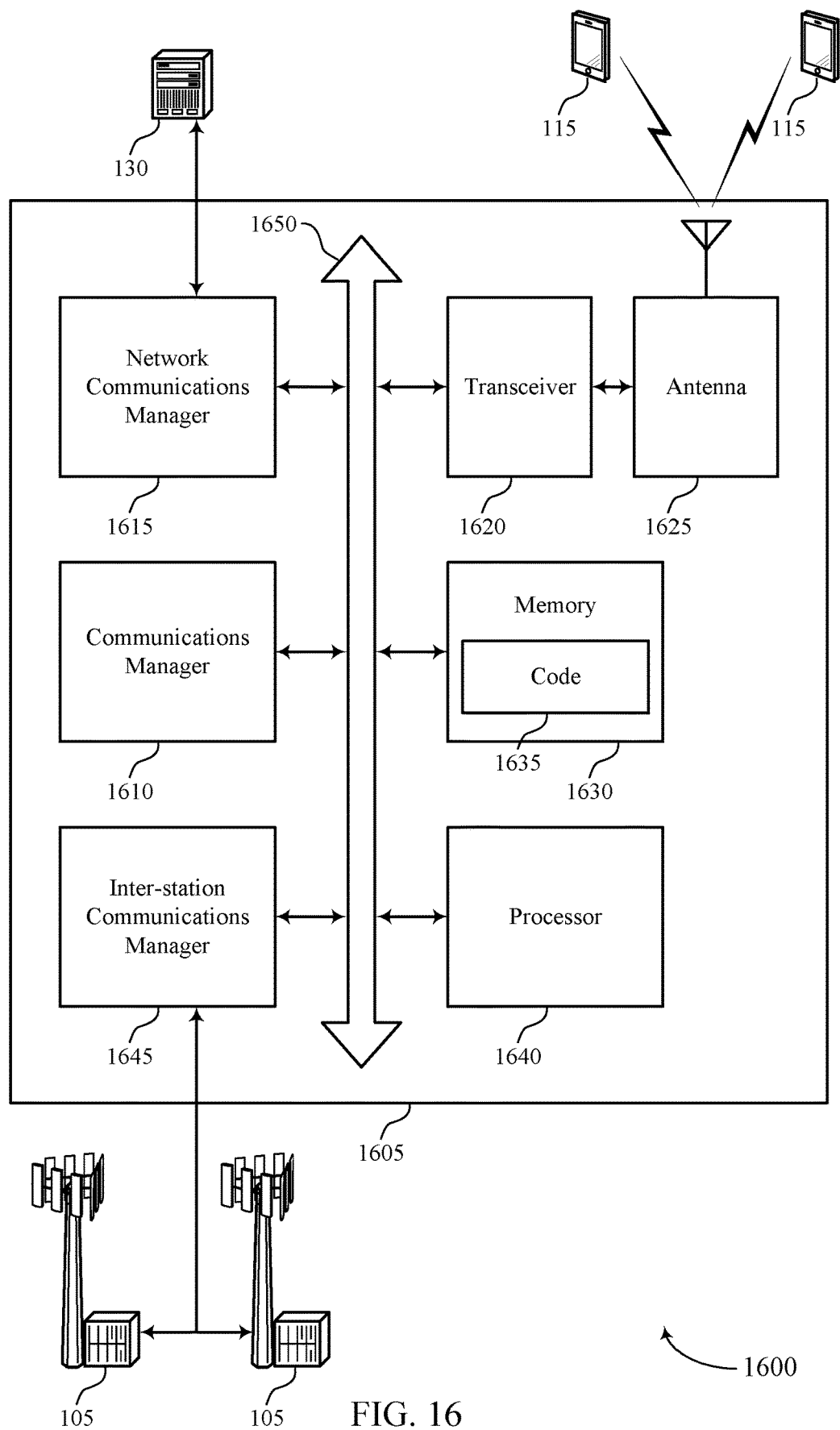
FIG. 16 shows a diagram of a system including a device that supports dynamic BWP switching for full duplex operation in unpaired spectrum in accordance with aspects of the present disclosure.

FIG. 16 shows a diagram of a system 1600 including a device 1605 that supports dynamic BWP switching for full duplex operation in unpaired spectrum in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may receive an indication of a capability of a UE to operate in a full duplex mode on a single carrier in an unpaired radio frequency spectrum based on a first BWP configuration. The communications manager 1610 may transmit an indication of a second BWP configuration for one or more slots of a set of slots based on receiving the indication of the capability of the UE, the second BWP configuration including a configuration associated with an uplink BWP and a downlink BWP. The communications manager 1610 may communicate with the UE according to the second BWP configuration in the one or more slots of the set of slots based on transmitting the indication of the second BWP configuration.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting dynamic BWP switching for full duplex operation in unpaired spectrum).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
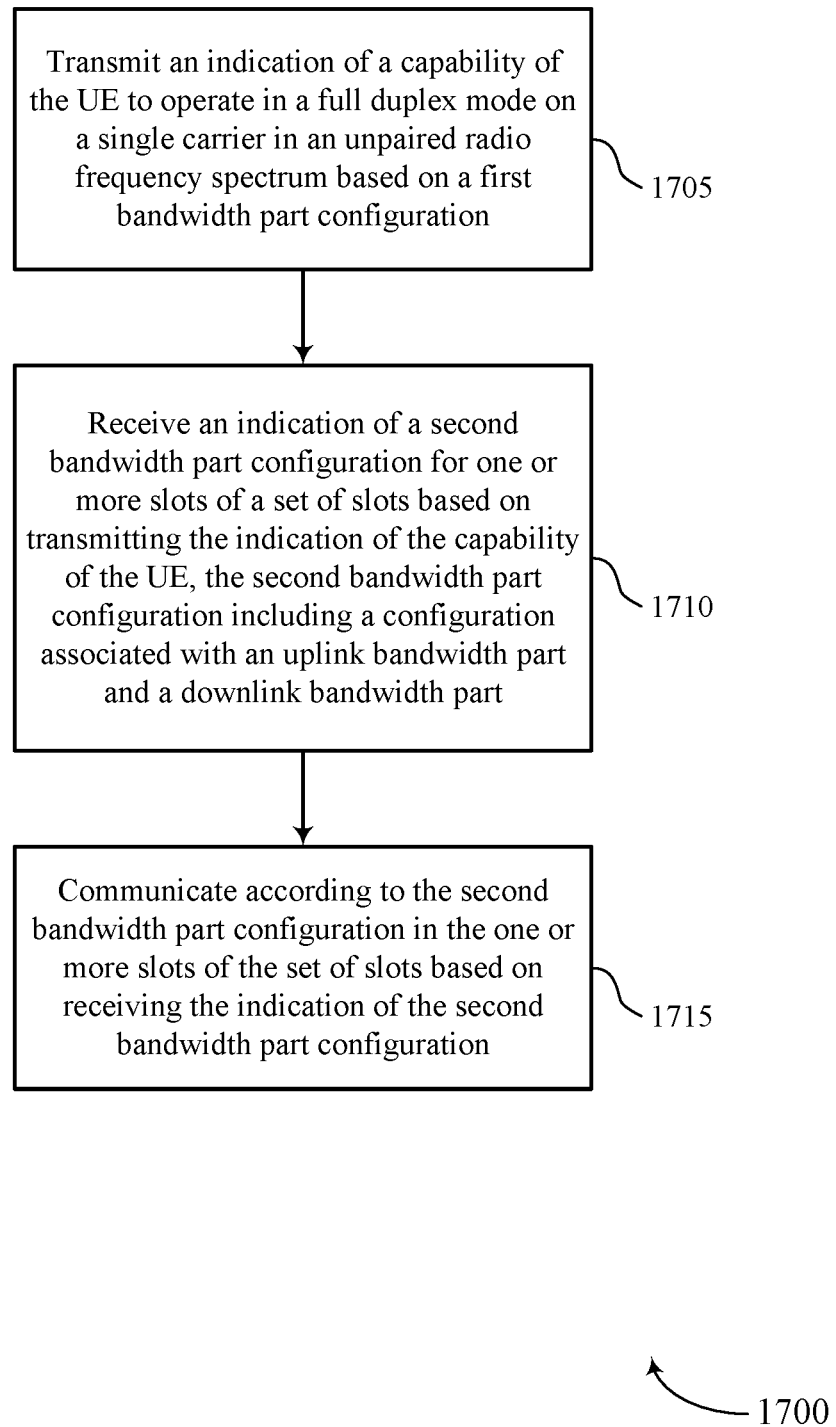
FIGS. 17 through 20 show flowcharts illustrating methods that support dynamic BWP switching for full duplex operation in unpaired spectrum in accordance with aspects of the present disclosure.

FIG. 17 shows a flowchart illustrating a method 1700 that supports dynamic BWP switching for full duplex operation in unpaired spectrum in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may transmit an indication of a capability of the UE to operate in a full duplex mode on a single carrier in an unpaired radio frequency spectrum based on a first BWP configuration. The operations of 1705 may be performed according to the methods described herein. In some examples, aspects of the operations of 1705 may be performed by a capability indication component as described with reference to FIGS. 9 through 12.

At 1710, the UE may receive an indication of a second BWP configuration for one or more slots of a set of slots based on transmitting the indication of the capability of the UE, the second BWP configuration including a configuration associated with an uplink BWP and a downlink BWP. The operations of 1710 may be performed according to the methods described herein. In some examples, aspects of the operations of 1710 may be performed by a BWP configuration component as described with reference to FIGS. 9 through 12.

At 1715, the UE may communicate according to the second BWP configuration in the one or more slots of the set of slots based on receiving the indication of the second BWP configuration. The operations of 1715 may be performed according to the methods described herein. In some examples, aspects of the operations of 1715 may be performed by a communication component as described with reference to FIGS. 9 through 12.

Figure 18:
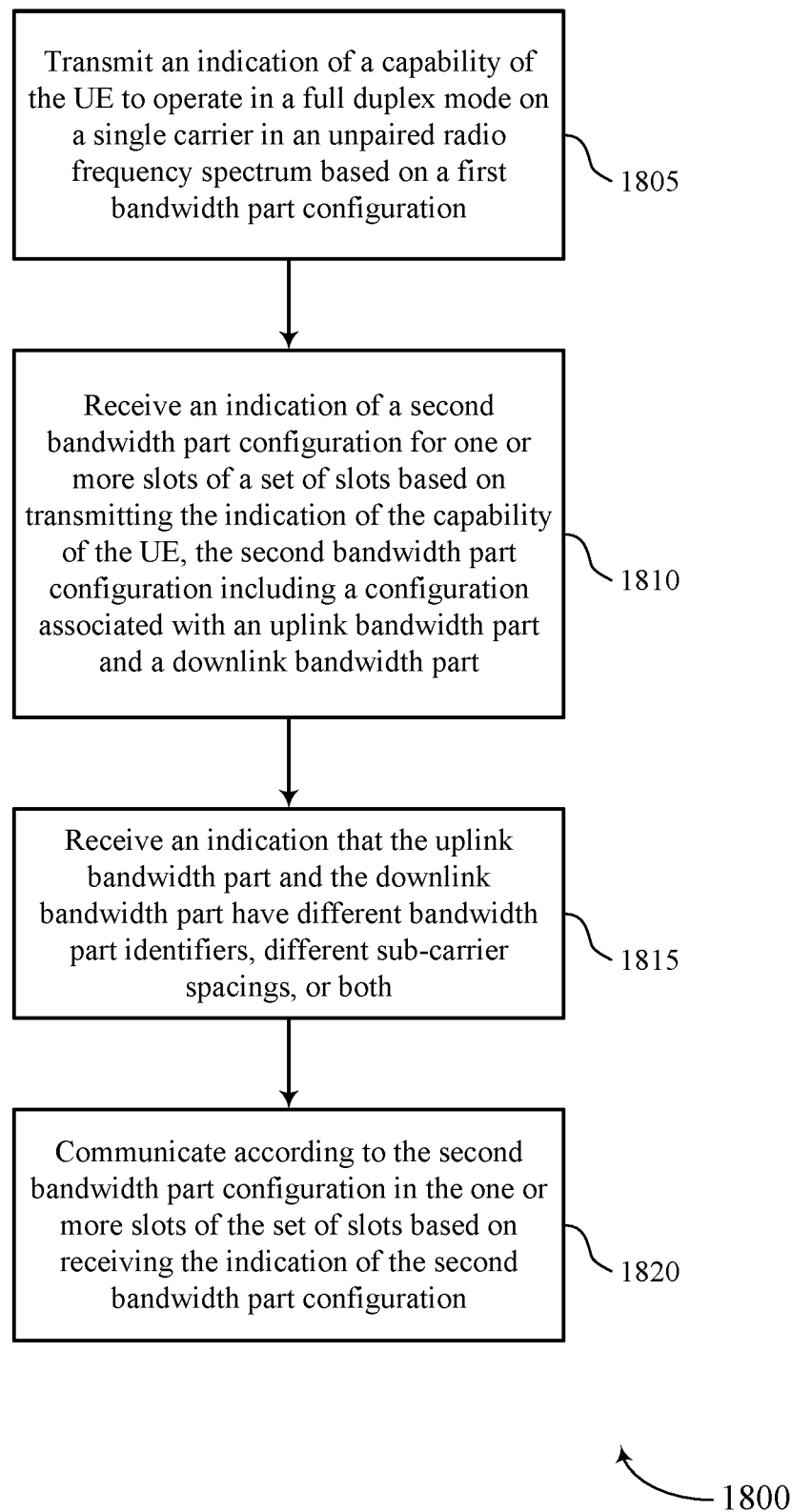

FIG. 18 shows a flowchart illustrating a method 1800 that supports dynamic BWP switching for full duplex operation in unpaired spectrum in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may transmit an indication of a capability of the UE to operate in a full duplex mode on a single carrier in an unpaired radio frequency spectrum based on a first BWP configuration. The operations of 1805 may be performed according to the methods described herein. In some examples, aspects of the operations of 1805 may be performed by a capability indication component as described with reference to FIGS. 9 through 12.

At 1810, the UE may receive an indication of a second BWP configuration for one or more slots of a set of slots based on transmitting the indication of the capability of the UE, the second BWP configuration including a configuration associated with an uplink BWP and a downlink BWP. The operations of 1810 may be performed according to the methods described herein. In some examples, aspects of the operations of 1810 may be performed by a BWP configuration component as described with reference to FIGS. 9 through 12.

At 1815, the UE may receive an indication that the uplink BWP and the downlink BWP have different BWP identifiers, different SCSs, or both. The operations of 1815 may be performed according to the methods described herein. In some examples, aspects of the operations of 1815 may be performed by a BWP configuration component as described with reference to FIGS. 9 through 12.

At 1820, the UE may communicate according to the second BWP configuration in the one or more slots of the set of slots based on receiving the indication of the second BWP configuration. The operations of 1820 may be performed according to the methods described herein. In some examples, aspects of the operations of 1820 may be performed by a communication component as described with reference to FIGS. 9 through 12.

Figure 19:
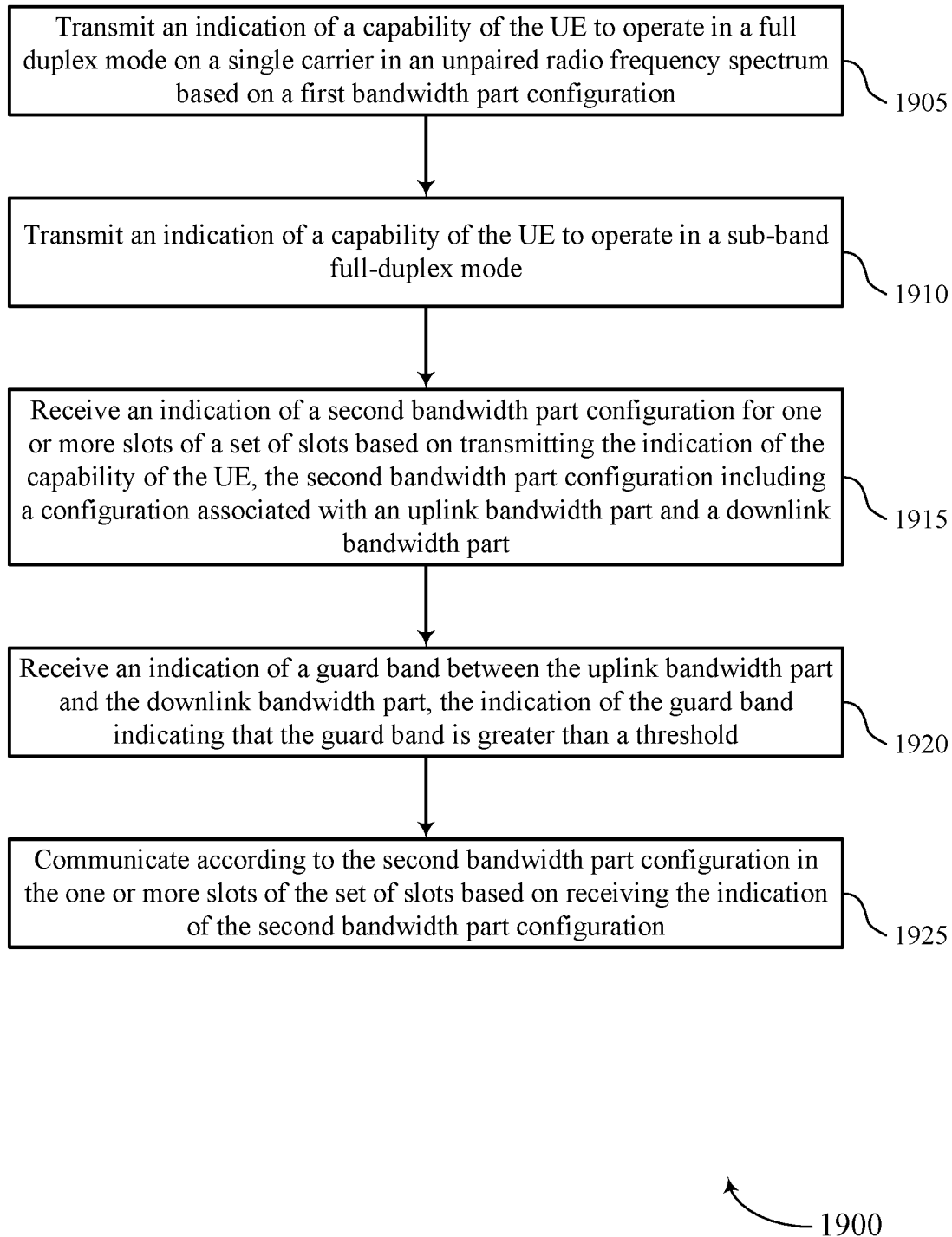

FIG. 19 shows a flowchart illustrating a method 1900 that supports dynamic BWP switching for full duplex operation in unpaired spectrum in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may transmit an indication of a capability of the UE to operate in a full duplex mode on a single carrier in an unpaired radio frequency spectrum based on a first BWP configuration. The operations of 1905 may be performed according to the methods described herein. In some examples, aspects of the operations of 1905 may be performed by a capability indication component as described with reference to FIGS. 9 through 12.

At 1910, the UE may transmit an indication of a capability of the UE to operate in a sub-band full-duplex mode. The operations of 1910 may be performed according to the methods described herein. In some examples, aspects of the operations of 1910 may be performed by a capability indication component as described with reference to FIGS. 9 through 12.

At 1915, the UE may receive an indication of a second BWP configuration for one or more slots of a set of slots based on transmitting the indication of the capability of the UE, the second BWP configuration including a configuration associated with an uplink BWP and a downlink BWP. The operations of 1915 may be performed according to the methods described herein. In some examples, aspects of the operations of 1915 may be performed by a BWP configuration component as described with reference to FIGS. 9 through 12.

At 1920, the UE may receive an indication of a guard band between the uplink BWP and the downlink BWP, the indication of the guard band indicating that the guard band is greater than a threshold. The operations of 1920 may be performed according to the methods described herein. In some examples, aspects of the operations of 1920 may be performed by a guard band indication component as described with reference to FIGS. 9 through 12.

At 1925, the UE may communicate according to the second BWP configuration in the one or more slots of the set of slots based on receiving the indication of the second BWP configuration. The operations of 1925 may be performed according to the methods described herein. In some examples, aspects of the operations of 1925 may be performed by a communication component as described with reference to FIGS. 9 through 12.

Figure 20:
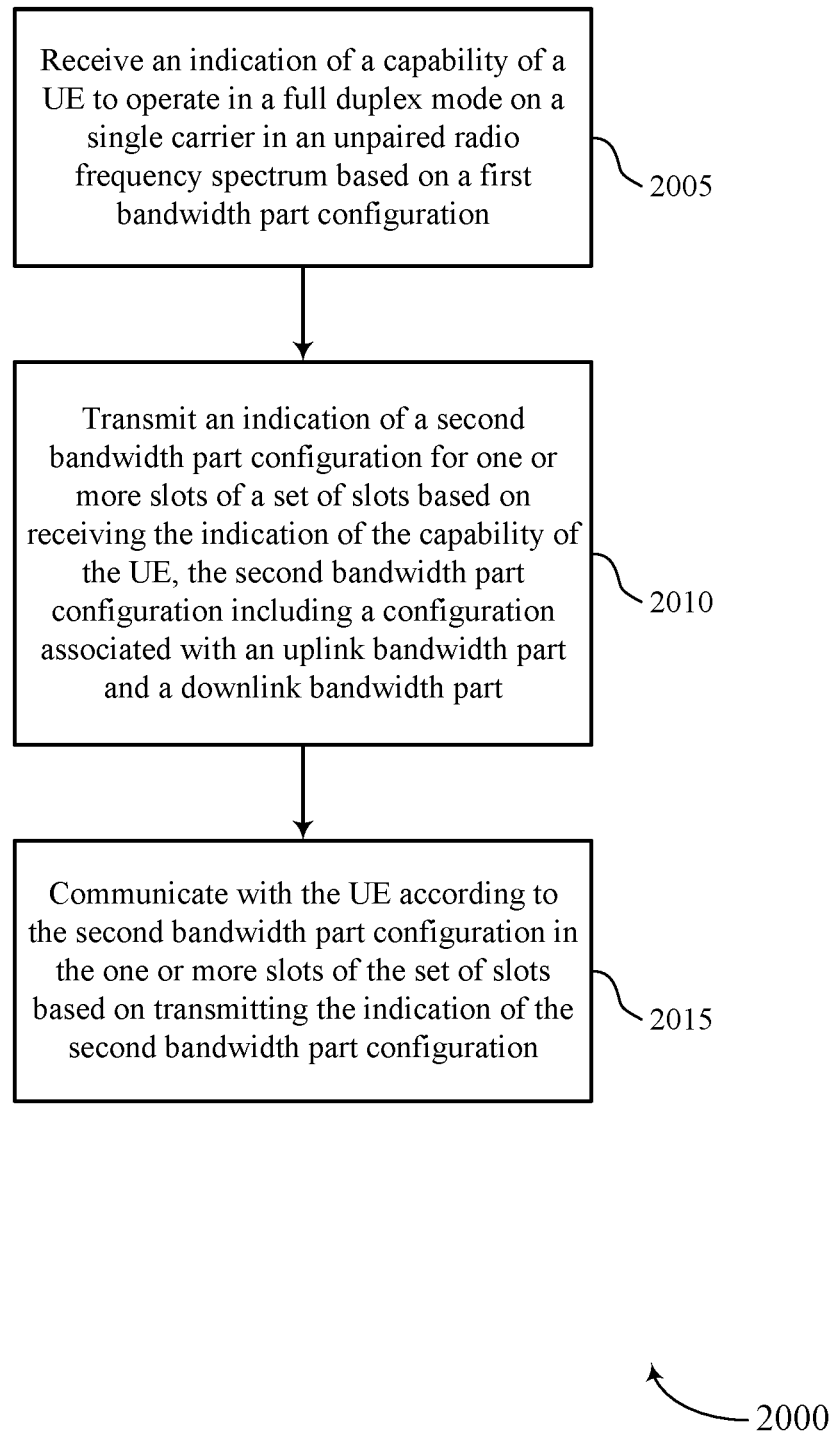

FIG. 20 shows a flowchart illustrating a method 2000 that supports dynamic BWP switching for full duplex operation in unpaired spectrum in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2005, the base station may receive an indication of a capability of a UE to operate in a full duplex mode on a single carrier in an unpaired radio frequency spectrum based on a first BWP configuration. The operations of 2005 may be performed according to the methods described herein. In some examples, aspects of the operations of 2005 may be performed by a capability reception component as described with reference to FIGS. 13 through 16.

At 2010, the base station may transmit an indication of a second BWP configuration for one or more slots of a set of slots based on receiving the indication of the capability of the UE, the second BWP configuration including a configuration associated with an uplink BWP and a downlink BWP. The operations of 2010 may be performed according to the methods described herein. In some examples, aspects of the operations of 2010 may be performed by a BWP indication component as described with reference to FIGS. 13 through 16.

At 2015, the base station may communicate with the UE according to the second BWP configuration in the one or more slots of the set of slots based on transmitting the indication of the second BWP configuration. The operations of 2015 may be performed according to the methods described herein. In some examples, aspects of the operations of 2015 may be performed by a BWP communication component as described with reference to FIGS. 13 through 16.

The following provides an overview of aspects of the present disclosure:

Aspect 1: A method for wireless communications at a UE, comprising: transmitting an indication of a capability of the UE to operate in a full duplex mode on a single carrier in an unpaired radio frequency spectrum based at least in part on a first BWP configuration; receiving an indication of a second BWP configuration for one or more slots of a plurality of slots based at least in part on transmitting the indication of the capability of the UE, the second BWP configuration comprising a configuration associated with an uplink BWP and a downlink BWP; and communicating according to the second BWP configuration in the one or more slots of the plurality of slots based at least in part on receiving the indication of the second BWP configuration.

Aspect 2: The method of aspect 1, wherein receiving the indication of the second BWP configuration comprises: receiving an indication that the uplink BWP and the downlink BWP have different BWP identifiers, different sub-carrier spacings, or both.

Aspect 3: The method of any of aspects 1 through 2, wherein receiving the indication of the second BWP configuration comprises: receiving an indication that the uplink BWP and the downlink BWP have one or more same BWP identifiers, and one or more of different sub-carrier spacings or different center frequencies.

Aspect 4: The method of any of aspects 1 through 3, wherein receiving the indication of the second BWP configuration comprises: receiving an indication that the uplink BWP and the downlink BWP have one or more same BWP identifiers, and one or more of one or more same sub-carrier spacings or one or more same center frequencies.

Aspect 5: The method of any of aspects 1 through 4, wherein transmitting the indication of the capability of the UE to operate in the full duplex mode comprises: transmitting an indication of a capability of the UE to operate in a sub-band full-duplex mode.

Aspect 6: The method of aspect 5, wherein receiving the indication of the second BWP configuration comprises: receiving an indication of a guard band between the uplink BWP and the downlink BWP, the indication of the guard band indicating that the guard band is greater than a threshold.

Aspect 7: The method of any of aspects 5 through 6, wherein receiving the indication of the second BWP configuration comprises: receiving DCI indicating a change of an active BWP corresponding to one of the uplink BWP or the downlink BWP based at least in part on a guard band between the uplink BWP and the downlink BWP being less than a threshold; and adjusting, based at least in part on the DCI, one of the uplink BWP or the downlink BWP such that the guard band between the uplink BWP and the downlink BWP are greater than the threshold.

Aspect 8: The method of aspect 7, wherein receiving the DCI indicating the change of the active BWP comprises: receiving a downlink DCI indicating a change in a downlink BWP; and adjusting, based at least in part in the downlink DCI, the downlink BWP and an uplink BWP.

Aspect 9: The method of any of aspects 7 through 8, wherein receiving the DCI indicating the change of the active BWP comprises: receiving an uplink DCI indicating a change in an uplink BWP; and adjusting, based at least in part in the uplink DCI, the uplink BWP and a downlink BWP.

Aspect 10: The method of any of aspects 7 through 9, wherein the uplink BWP and the downlink BWP each correspond to different BWP identifiers based at least in part on adjusting the one of the uplink BWP or the downlink BWP.

Aspect 11: The method of any of aspects 5 through 10, wherein receiving the indication of the second BWP configuration comprises: receiving DCI indicating a change of an active BWP corresponding to one of the uplink BWP or the downlink BWP based at least in part on a guard band between the uplink BWP and the downlink BWP being less than a threshold; and adjusting, based at least in part on DCI, the uplink BWP and the downlink BWP such that the guard band between the uplink BWP and the downlink BWP are greater than the threshold.

Aspect 12: The method of aspect 11, wherein the uplink BWP and the downlink BWP have a same BWP identifier based at least in part on adjusting the uplink BWP and the downlink BWP.

Aspect 13: The method of any of aspects 5 through 12, wherein receiving the indication of the second BWP configuration comprises: receiving DCI indicating a change of active BWPs corresponding to both of the uplink BWP and the downlink BWP and indicating a slot offset value for a downlink reception or an uplink transmission, the slot offset value being smaller than a delay for the UE to adjust the uplink BWP and the downlink BWP; and adjusting, based at least in part on DCI, the uplink BWP and the downlink BWP before an expiration of the slot offset value.

Aspect 14: The method of aspect 13, wherein, receiving the DCI comprises: receiving a scheduling DCI corresponding to a downlink DCI or an uplink DCI.

Aspect 15: The method of any of aspects 5 through 14, wherein receiving the indication of the second BWP configuration comprises: receiving DCI indicating a change of active BWPs corresponding to both of the uplink BWP and the downlink BWP and indicating a slot offset value for a downlink reception or an uplink transmission.

Aspect 16: The method of aspect 15, further comprising: refraining from communicating during a duration after receiving the DCI until a slot indicated by the slot offset value.

Aspect 17: The method of any of aspects 15 through 16, further comprising: determining that a priority of the DCI is lower than a priority of a communication scheduled during a duration after receiving the DCI until a slot indicated by the slot offset value; and performing the communication scheduled based at least in part on determining that the priority of the DCI is lower than the priority of the communication.

Aspect 18: The method of any of aspects 5 through 17, wherein receiving the indication of the second BWP configuration comprises: receiving DCI indicating a change of active BWPs corresponding to both of the uplink BWP and the downlink BWP and indicating a slot offset value for a downlink reception or an uplink transmission; and refraining from communicating a communication scheduled during a duration after receiving the DCI until a slot indicated by the slot offset value, the slot indicated by the offset value corresponding to a slot in which the change of the active BWPs is to occur.

Aspect 19: The method of any of aspects 5 through 18, wherein receiving the indication of the second BWP configuration comprises: receiving DCI indicating a change of active BWPs corresponding to both of the uplink BWP and the downlink BWP and indicating a slot offset value for a downlink reception or an uplink transmission; and refraining from communicating a communication scheduled during a duration after receiving a second DCI received after the DCI and until a slot indicated by the slot offset value, the slot indicated by the offset value corresponding to a slot in which the change of the active BWPs is to occur.

Aspect 20: The method of any of aspects 1 through 19, wherein receiving the indication of the second BWP configuration comprises: receiving DCI indicating a change of active BWPs corresponding to both of the uplink BWP and the downlink BWP and indicating a different BWP identifier for each of the uplink BWP and the downlink BWP.

Aspect 21: The method of any of aspects 1 through 20, wherein the full duplex mode comprises: a FDD mode.

Aspect 22: A method for wireless communications at a base station, comprising: receiving an indication of a capability of a UE to operate in a full duplex mode on a single carrier in an unpaired radio frequency spectrum based at least in part on a first BWP configuration; transmitting an indication of a second BWP configuration for one or more slots of a plurality of slots based at least in part on receiving the indication of the capability of the UE, the second BWP configuration comprising a configuration associated with an uplink BWP and a downlink BWP; and communicating with the UE according to the second BWP configuration in the one or more slots of the plurality of slots based at least in part on transmitting the indication of the second BWP configuration.

Aspect 23: The method of aspect 22, wherein transmitting the indication of the second BWP configuration comprises: transmitting an indication that the uplink BWP and the downlink BWP have different BWP identifiers, different sub-carrier spacings, or both.

Aspect 24: The method of any of aspects 22 through 23, wherein transmitting the indication of the second BWP configuration comprises: transmitting an indication that the uplink BWP and the downlink BWP have one or more same BWP identifiers, and one or more of different sub-carrier spacings or different center frequencies.

Aspect 25: The method of any of aspects 22 through 24, wherein transmitting the indication of the second BWP configuration comprises: transmitting an indication that the uplink BWP and the downlink BWP have one or more same BWP identifiers, and one or more of one or more same sub-carrier spacings or one or more same center frequencies.

Aspect 26: The method of any of aspects 22 through 25, wherein receiving the indication of the capability of the UE to operate in the full duplex mode comprises: receiving an indication of a capability of the UE to operate in a sub-band full-duplex mode.

Aspect 27: The method of aspect 26, wherein transmitting the indication of the second BWP configuration comprises: transmitting DCI indicating a change of active BWPs corresponding to both of the uplink BWP and the downlink BWP and indicating a slot offset value for a downlink reception or an uplink transmission.

Aspect 28: The method of aspect 27, further comprising: determining that a priority of the DCI is lower than a priority of a communication scheduled during a duration after receiving the DCI until a slot indicated by the slot offset value; and performing the communication scheduled based at least in part on determining that the priority of the DCI is lower than the priority of the communication.

Aspect 29: An apparatus for wireless communications at a UE, comprising a processor; memory coupled with the processor; and instructions stored in the memory and executable by the processor to cause the apparatus to perform a method of any of aspects 1 through 21.

Aspect 30: An apparatus for wireless communications at a UE, comprising at least one means for performing a method of any of aspects 1 through 21.

Aspect 31: A non-transitory computer-readable medium storing code for wireless communications at a UE, the code comprising instructions executable by a processor to perform a method of any of aspects 1 through 21.

Aspect 32: An apparatus for wireless communications at a base station, comprising a processor; memory coupled with the processor; and instructions stored in the memory and executable by the processor to cause the apparatus to perform a method of any of aspects 22 through 28.

Aspect 33: An apparatus for wireless communications at a base station, comprising at least one means for performing a method of any of aspects 22 through 28.

Aspect 34: A non-transitory computer-readable medium storing code for wireless communications at a base station, the code comprising instructions executable by a processor to perform a method of any of aspects 22 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   transmitting an indication of a capability of the UE to operate in a full duplex mode on a single carrier in an unpaired radio frequency spectrum based at least in part on a first bandwidth part configuration, the indication further indicating that the UE is capable of dynamically switching bandwidth part configurations;
   receiving an indication of a second bandwidth part configuration for one or more slots of a plurality of slots based at least in part on transmitting the indication of the capability of the UE, the second bandwidth part configuration comprising a configuration associated with an uplink bandwidth part and a downlink bandwidth part; and
   communicating according to the second bandwidth part configuration in the one or more slots of the plurality of slots based at least in part on receiving the indication of the second bandwidth part configuration.

2. The method of claim 1, wherein receiving the indication of the second bandwidth part configuration comprises:
   receiving an indication that the uplink bandwidth part and the downlink bandwidth part have different bandwidth part identifiers, different sub-carrier spacings, or both.

3. The method of claim 1, wherein receiving the indication of the second bandwidth part configuration comprises:
   receiving an indication that the uplink bandwidth part and the downlink bandwidth part have one or more same bandwidth part identifiers, and one or more of different sub-carrier spacings or different center frequencies.

4. The method of claim 1, wherein receiving the indication of the second bandwidth part configuration comprises:
   receiving an indication that the uplink bandwidth part and the downlink bandwidth part have one or more same bandwidth part identifiers, and one or more of one or more same sub-carrier spacings or one or more same center frequencies.

5. The method of claim 1, wherein transmitting the indication of the capability of the UE to operate in the full duplex mode comprises:
   transmitting an indication of a capability of the UE to operate in a sub-band full-duplex mode.

6. The method of claim 5, wherein receiving the indication of the second bandwidth part configuration comprises:
   receiving an indication of a guard band between the uplink bandwidth part and the downlink bandwidth part, the indication of the guard band indicating that the guard band is greater than a threshold.

7. The method of claim 5, wherein receiving the indication of the second bandwidth part configuration comprises:
   receiving downlink control information indicating a change of an active bandwidth part corresponding to one of the uplink bandwidth part or the downlink bandwidth part based at least in part on a guard band between the uplink bandwidth part and the downlink bandwidth part being less than a threshold; and
   adjusting, based at least in part on the downlink control information, one of the uplink bandwidth part or the downlink bandwidth part such that the guard band between the uplink bandwidth part and the downlink bandwidth part are greater than the threshold.

8. The method of claim 7, wherein receiving the downlink control information indicating the change of the active bandwidth part comprises:
   receiving a downlink downlink control information indicating a change in a downlink bandwidth part; and
   adjusting, based at least in part in the downlink downlink control information, the downlink bandwidth part and an uplink bandwidth part.

9. The method of claim 7, wherein receiving the downlink control information indicating the change of the active bandwidth part comprises:
   receiving an uplink downlink control information indicating a change in an uplink bandwidth part; and
   adjusting, based at least in part in the uplink downlink control information, the uplink bandwidth part and a downlink bandwidth part.

10. The method of claim 7, wherein the uplink bandwidth part and the downlink bandwidth part each correspond to different bandwidth part identifiers based at least in part on adjusting one of the uplink bandwidth part or the downlink bandwidth part.

11. The method of claim 5, wherein receiving the indication of the second bandwidth part configuration comprises:
   receiving downlink control information indicating a change of an active bandwidth part corresponding to one of the uplink bandwidth part or the downlink bandwidth part based at least in part on a guard band between the uplink bandwidth part and the downlink bandwidth part being less than a threshold; and
   adjusting, based at least in part on downlink control information, the uplink bandwidth part and the downlink bandwidth part such that the guard band between the uplink bandwidth part and the downlink bandwidth part are greater than the threshold.

12. The method of claim 11, wherein the uplink bandwidth part and the downlink bandwidth part have a same bandwidth part identifier based at least in part on adjusting the uplink bandwidth part and the downlink bandwidth part.

13. The method of claim 5, wherein receiving the indication of the second bandwidth part configuration comprises:
receiving downlink control information indicating a change of active bandwidth parts corresponding to both of the uplink bandwidth part and the downlink bandwidth part and indicating a slot offset value for a downlink reception or an uplink transmission, the slot offset value being smaller than a delay for the UE to adjust the uplink bandwidth part and the downlink bandwidth part; and
adjusting, based at least in part on downlink control information, the uplink bandwidth part and the downlink bandwidth part before an expiration of the slot offset value.

14. The method of claim 13, wherein, receiving the downlink control information comprises:
receiving a scheduling downlink control information corresponding to a downlink downlink control information or an uplink downlink control information.

15. The method of claim 5, wherein receiving the indication of the second bandwidth part configuration comprises:
receiving downlink control information indicating a change of active bandwidth parts corresponding to both of the uplink bandwidth part and the downlink bandwidth part and indicating a slot offset value for a downlink reception or an uplink transmission.

16. The method of claim 15, further comprising:
refraining from communicating during a duration after receiving the downlink control information until a slot indicated by the slot offset value.

17. The method of claim 15, further comprising:
determining that a priority of the downlink control information is lower than a priority of a communication scheduled during a duration after receiving the downlink control information until a slot indicated by the slot offset value; and
performing the communication scheduled based at least in part on determining that the priority of the downlink control information is lower than the priority of the communication.

18. The method of claim 5, wherein receiving the indication of the second bandwidth part configuration comprises:
receiving downlink control information indicating a change of active bandwidth parts corresponding to both of the uplink bandwidth part and the downlink bandwidth part and indicating a slot offset value for a downlink reception or an uplink transmission; and
refraining from communicating a communication scheduled during a duration after receiving the downlink control information until a slot indicated by the slot offset value, the slot indicated by the slot offset value corresponding to a slot in which the change of the active bandwidth parts is to occur.

19. The method of claim 5, wherein receiving the indication of the second bandwidth part configuration comprises:
receiving downlink control information indicating a change of active bandwidth parts corresponding to both of the uplink bandwidth part and the downlink bandwidth part and indicating a slot offset value for a downlink reception or an uplink transmission; and
refraining from communicating a communication scheduled during a duration after receiving a second downlink control information received after the downlink control information and until a slot indicated by the slot offset value, the slot indicated by the slot offset value corresponding to a slot in which the change of the active bandwidth parts is to occur.

20. The method of claim 1, wherein receiving the indication of the second bandwidth part configuration comprises:
receiving downlink control information indicating a change of active bandwidth parts corresponding to both of the uplink bandwidth part and the downlink bandwidth part and indicating a different bandwidth part identifier for each of the uplink bandwidth part and the downlink bandwidth part.

21. The method of claim 1, wherein the full duplex mode comprises:
a frequency division duplex mode.

22. A method for wireless communications at a network entity, comprising:
receiving an indication of a capability of a user equipment (UE) to operate in a full duplex mode on a single carrier in an unpaired radio frequency spectrum based at least in part on a first bandwidth part configuration, the indication further indicating that the UE is capable of dynamically switching bandwidth part configurations;
transmitting an indication of a second bandwidth part configuration for one or more slots of a plurality of slots based at least in part on receiving the indication of the capability of the UE, the second bandwidth part configuration comprising a configuration associated with an uplink bandwidth part and a downlink bandwidth part; and
communicating with the UE according to the second bandwidth part configuration in the one or more slots of the plurality of slots based at least in part on transmitting the indication of the second bandwidth part configuration.

23. The method of claim 22, wherein transmitting the indication of the second bandwidth part configuration comprises:
transmitting an indication that the uplink bandwidth part and the downlink bandwidth part have different bandwidth part identifiers, different sub-carrier spacings, or both.

24. The method of claim 22, wherein transmitting the indication of the second bandwidth part configuration comprises:
transmitting an indication that the uplink bandwidth part and the downlink bandwidth part have one or more same bandwidth part identifiers, and one or more of different sub-carrier spacings or different center frequencies.

25. The method of claim 22, wherein transmitting the indication of the second bandwidth part configuration comprises:
transmitting an indication that the uplink bandwidth part and the downlink bandwidth part have one or more same bandwidth part identifiers, and one or more of one or more same sub-carrier spacings or one or more same center frequencies.

26. The method of claim 22, wherein receiving the indication of the capability of the UE to operate in the full duplex mode comprises:

receiving an indication of a capability of the UE to operate in a sub-band full-duplex mode.

27. The method of claim 26, wherein transmitting the indication of the second bandwidth part configuration comprises:
transmitting downlink control information indicating a change of active bandwidth parts corresponding to both of the uplink bandwidth part and the downlink bandwidth part and indicating a slot offset value for a downlink reception or an uplink transmission.

28. The method of claim 27, further comprising:
determining that a priority of the downlink control information is lower than a priority of a communication scheduled during a duration after receiving the downlink control information until a slot indicated by the slot offset value; and
performing the communication scheduled based at least in part on determining that the priority of the downlink control information is lower than the priority of the communication.

29. An apparatus for wireless communications at a user equipment (UE), comprising:
a processor,
memory coupled with the processor; and
instructions stored in the memory and executable by the processor to cause the apparatus to:
transmit an indication of a capability of the UE to operate in a full duplex mode on a single carrier in an unpaired radio frequency spectrum based at least in part on a first bandwidth part configuration, the indication further indicating that the UE is capable of dynamically switching bandwidth part configurations;
receive an indication of a second bandwidth part configuration for one or more slots of a plurality of slots based at least in part on transmitting the indication of the capability of the UE, the second bandwidth part configuration comprising a configuration associated with an uplink bandwidth part and a downlink bandwidth part; and
communicate according to the second bandwidth part configuration in the one or more slots of the plurality of slots based at least in part on receiving the indication of the second bandwidth part configuration.

30. An apparatus for wireless communications at a network entity, comprising:
a processor,
memory coupled with the processor; and
instructions stored in the memory and executable by the processor to cause the apparatus to:
receive an indication of a capability of a user equipment (UE) to operate in a full duplex mode on a single carrier in an unpaired radio frequency spectrum based at least in part on a first bandwidth part configuration, the indication further indicating that the UE is capable of dynamically switching bandwidth part configurations;
transmit an indication of a second bandwidth part configuration for one or more slots of a plurality of slots based at least in part on receiving the indication of the capability of the UE, the second bandwidth part configuration comprising a configuration associated with an uplink bandwidth part and a downlink bandwidth part; and
communicate with the UE according to the second bandwidth part configuration in the one or more slots of the plurality of slots based at least in part on transmitting the indication of the second bandwidth part configuration.

* * * * *